(12) United States Patent
Desi Reddy et al.

(10) Patent No.: US 12,533,343 B2
(45) Date of Patent: Jan. 27, 2026

(54) METHOD FOR PREPARING (−)-CIBENZOLINE SUCCINATE

(71) Applicant: CELLTRION, INC., Incheon (KR)

(72) Inventors: Srinivas Reddy Desi Reddy, Telangana (IN); Vijayavitthal Thippannachar Mathad, Telangana (IN); Dnyandev Ragho Rane, Telangana (IN); Vikas Shivaji Patil, Telangana (IN)

(73) Assignee: Celltrion, Inc., Incheon (KR)

( * ) Notice: Subject to any disclaimer, the term of this patent is extended or adjusted under 35 U.S.C. 154(b) by 1312 days.

(21) Appl. No.: 17/279,674

(22) PCT Filed: Sep. 20, 2019

(86) PCT No.: PCT/KR2019/012299
§ 371 (c)(1),
(2) Date: Dec. 27, 2021

(87) PCT Pub. No.: WO2020/067684
PCT Pub. Date: Apr. 2, 2020

(65) Prior Publication Data
US 2023/0122169 A1    Apr. 20, 2023

(30) Foreign Application Priority Data
Sep. 28, 2018 (IN) .............................. 201841036791

(51) Int. Cl.
*A61K 31/4164* (2006.01)
*A61P 9/06* (2006.01)
*C07C 55/10* (2006.01)
*C07D 233/10* (2006.01)

(52) U.S. Cl.
CPC ............ *A61K 31/4164* (2013.01); *A61P 9/06* (2018.01); *C07C 55/10* (2013.01); *C07D 233/10* (2013.01); *C07B 2200/13* (2013.01)

(58) Field of Classification Search
CPC ....... A61K 31/4164; A61P 9/06; C07C 55/10; C07D 233/10; C07B 2200/13
See application file for complete search history.

(56) References Cited

U.S. PATENT DOCUMENTS 3,903,104 A   9/1975  Cognaco
5,811,547 A   9/1998  Nakamichi et al.

FOREIGN PATENT DOCUMENTS

CN   101671305       3/2010
JP   S50-004072 A    1/1975
JP   H07-70070       3/1995
(Continued)

OTHER PUBLICATIONS

English Machine Translation of JP 2010132561 A obtained from Espacenet (Year: 2010).*

(Continued)

*Primary Examiner* — Joseph K McKane
*Assistant Examiner* — Jalisa Holmes Ferguson
(74) *Attorney, Agent, or Firm* — Fish & Richardson P.C.

(57) ABSTRACT

The present invention relates to a crystal form of (−)-Cibenzoline succinate. In addition, the present invention relates to a method for preparing (−)-cibenzoline succinate having a chiral purity of 99.9% or higher. Additionally, the present invention provides a method for preparing (−)-cibenzoline succinate and a crystal form thereof.

11 Claims, 4 Drawing Sheets

(56) References Cited

FOREIGN PATENT DOCUMENTS

| JP | H10-503752 | | 4/1998 |
|---|---|---|---|
| JP | 2008-519046 | | 6/2008 |
| JP | 2010-132561 | A | 6/2010 |
| JP | 2011-509933 | | 3/2011 |
| JP | 2011-514892 | | 5/2011 |
| JP | 2012-136526 | | 7/2012 |
| JP | 2015-17137 | A | 1/2015 |
| JP | 2015-017137 | A | 1/2015 |
| KR | 10-2007-0102665 | A | 10/2007 |
| KR | 10-2010-0118113 | A | 11/2010 |
| WO | WO 2017/204210 | A1 | 11/2017 |

OTHER PUBLICATIONS

Ferreira et al. "Rational approach to the selection of conditions for diastereomeric resolution of chiral amines by diacid resolving agents," Tetrahedron: Asymmetry, 2006, 17(9): 1337-1348 (Year: 2006).*

Takahashi et al. "Pharmacodynamics of Cibenzoline-Induced Hypoglycemia in Rats," Drug Metab. Pharmacokinet., 2011, 26(3):242-247 (Year: 2011).*

English Machine Translation of JP 2015017137A obtained from Espacenet (Year: 2015).*

Hsieh et al. "Salt Stability—The Effect of pHmax on Salt to Free Base Conversion," Pharm. Res. (2015), 32: 3110-3118 (Year: 2015).*

Extended Search Report in European Appln. No. 19864449.4, dated May 18, 2022, 9 pages.

Haruno et al., "Antiarrhythmic Effects of Optical Isomers of Cibenzoline on Canine Ventricular Arrhythmias, " Journal of Cardiovascular Pharmacology, 1990, 16(3):376-382.

Chinese Office Action in Chinese Appln. No. 201980061915.4, dated Mar. 31, 2023, 14 pages (with English Translation).

International Search Report for PCT/KR2019/012267, mailed Jan. 17, 2020. 3 pages.

Koyata et al., "Convenient preparation of optically active cibenzoline and analogues from 3,3-diaryl-2-propen-1-ols", Tetrahedron: Asymmetry 20 (2009) pp. 2065-2071.

Kotake et al., "Heart Failure Elevates Serum Levels of Cibenzoline in Arrhythmic Patients", Circulation Journal, vol. 70, May 2006, pp. 588-592.

Van den Brand et al., "Haemodynamic Effects of Intravenous Cibenzoline in Patients With Coronary Heart Disease", European Journal of Clinical Pharmacology, 1984, 26, pp. 297-302.

Miura, et al., "Syntheses of (R)-(+)-cibenzoline and analogues via catalytic enantioselective cyclopropanation using (S)-phenylalanine-derived disulfonamide", Tetrahedron: Asymmetry 17, 2006, pp. 3067-3069.

* cited by examiner

METHOD FOR PREPARING (−)-CIBENZOLINE SUCCINATE

TECHNICAL FIELD

The present invention relates to of (−)-Cibenzoline succinic acid salt.

The present invention also relates to a process for the preparation of (−)-Cibenzoline succinic acid salt with chiral purity greater than 99.9%.

The present invention also provides a process for the preparation of (−)-Cibenzoline succinic acid salt and a crystalline form thereof.

Formula (IA)

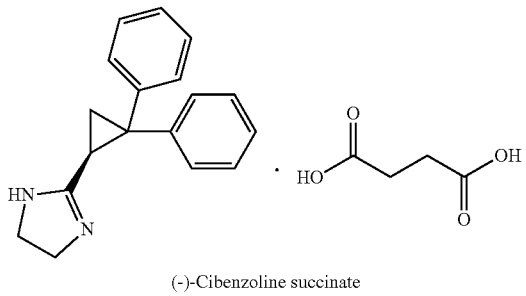

(−)-Cibenzoline succinate

BACKGROUND ART

Cibenzoline succinic acid salt(Racemic) is chemically known as (±)-2-(2,2-diphenylcyclopropyl)-2-imidazoline succinic acid salt with its structure (formula II). It was developed and marketed as Cipralan® by Bristol-Myers Squibb (BMS) and Exacor® by Laboratory XO in France. Cibenzoline succinic acid salt(Racemic) is Antiarrhythmic drug marketed under the trade names Cipralan and Exacor. Racemic Cibenzoline succinic acid salt was approved in France on Oct. 21, 1983 for treating patients with arrhythmic heart conditions. Cibenzoline is effective in treating arrhythmia heart disease (Eur J Clin Pharmacol. 1984; 26(3):297-302) and heart failure (Circ J. 2006 May; 70(5):588-92).

Formula (II)

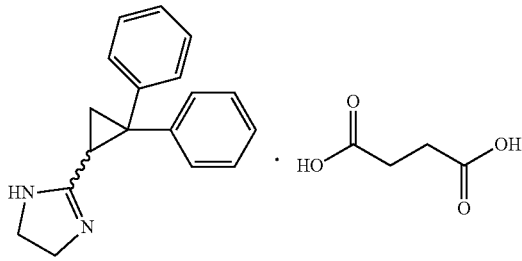

Enantiomerically, each (−)-Cibenzoline salt and (+)-Cibenzoline salt, for example the crystalline forms thereof are not known anywhere. For example, the crystalline forms of each (−)-Cibenzoline succinic acid salt and (+)-Cibenzoline succinic acid salt are not known anywhere.

Tetrahedron: Asymmetry 17 (2006) 3067-3069 discloses a process for the preparation of (+)-Cibenzoline from (+)-2,2-diphenylcyclopropylmethanol formula (VI) as follows; formula (VI) was oxidized with 2-iodoxybenzoic acid (IBX) in dimethylsulfoxide (DMSO) to afford the corresponding aldehyde of formula (VII), which was treated with sodium Chlorite ($NaClO_2$), hydrogen peroxide ($H_2O_2$), and sodium dihydrogen phosphate ($NaH_2PO_4$) in acetonitrile-water (MeCN—$H_2O$) to give acid compound of formula (VIII), further it was condensed with ethylenediamine ($H_2NCH_2CH_2NH_2$) in the presence of benzotriazol-1-yloxytripyrrolidinophosphonium hexafluorophosphate (PyBOP) and triethylamine ($Et_3N$) in dichloromethane ($CH_2Cl_2$) to give the corresponding amide compound of formula (IX). Finally, the amide of formula (IX) was converted under reduced pressure (2 mmHg) at 160° C. for 37 hours to obtain (+)-Cibenzoline.

The said synthetic process is illustrated in the following Scheme-I.

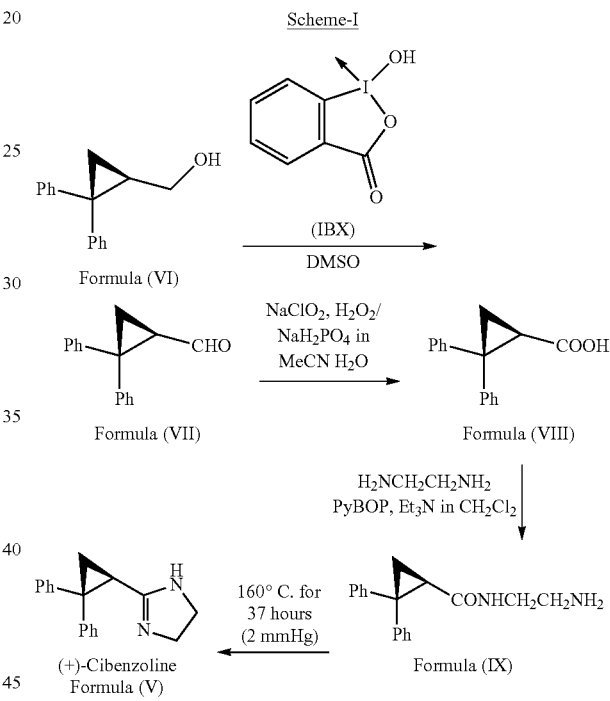

Tetrahedron: Asymmetry (2009), 20(17), 2065-2071 discloses a process for the preparation of (+)-Cibenzoline and it was synthesized from (+)-2,2-diphenylcyclopropylmethanol formula (VI) as follows; compound of formula (VI) with 76% enantiomeric excess (ee) was reacted with compound of formula (X) in triethylamine ($Et_3N$), 4-dimethylaminopyridine (DMAP), tetrahydrofuran (THF) to afford the corresponding ester of formula (XI) with ee of 76% which was recrystallized using a mixture of ethyl acetate (EtOAc) and hexane to give ester compound of formula (XII) with 98% ee. Ester compound was then treated with sodium ethoxide (EtONa) in ethanol (EtOH) to give corresponding alcohol compound of formula (VI) with 98% ee which was oxidized with 2-iodoxybenzoic acid (IBX) in dimethylsulfoxide (DMSO) to afford the corresponding aldehyde compound of formula (VII). Then, the aldehyde formula (VII) was reacted with ethylenediamine in iodine ($I_2$), potassium carbonate ($K_2CO_3$) in tert-butyl alcohol (tBuOH) to obtain (+)-Cibenzoline.

The said synthetic process is illustrated in the following Scheme-II.

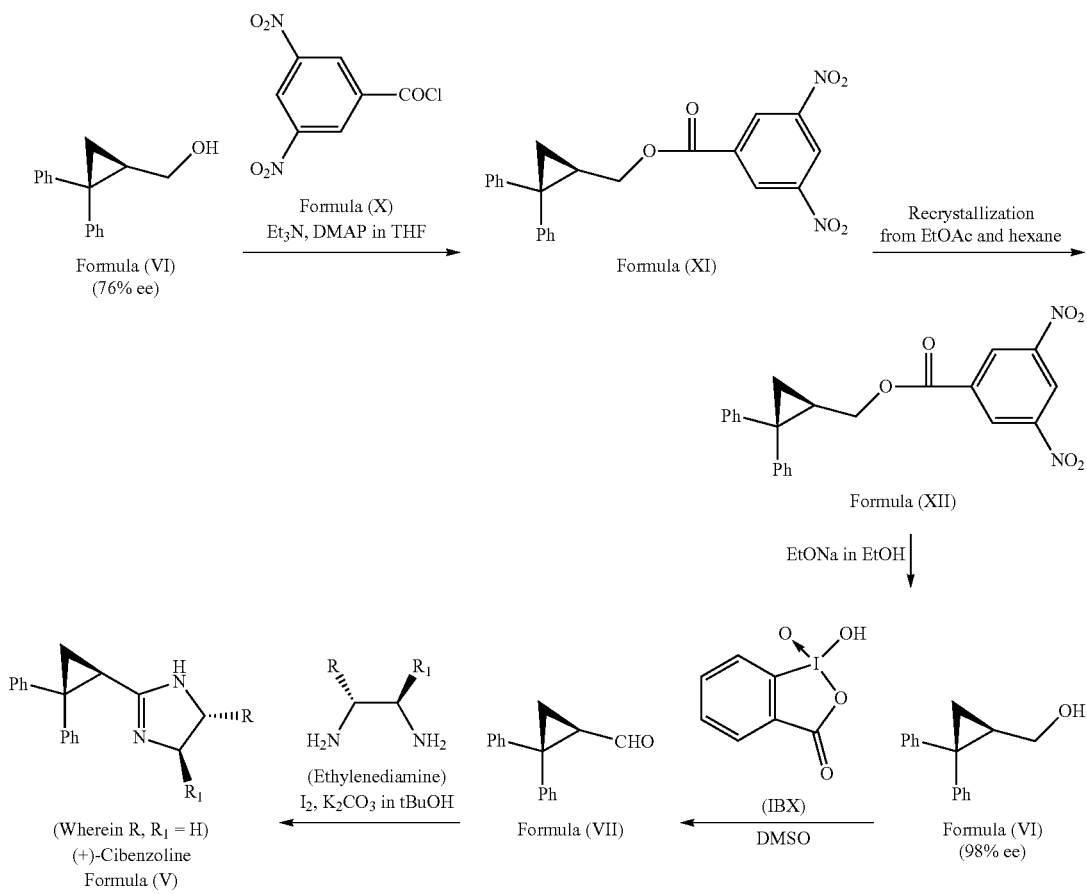

Scheme-II

The advantages of enantiomerically pure drugs use can potentially lead to simpler and more selective pharmacologic profiles, improved therapeutic indices, simpler pharmacokinetics due to different rates of metabolism of the different enantiomers, decreased drug interactions, and drug companies are increasingly using chiral switching as a marketing strategy. Additionally, due to different pharmacological activity, enantiomers of chiral drugs can differ in toxicity over racemic drugs.

Potential advantages of single-enantiomer drugs include: separating unwanted pharmacodynamic side effects from toxic effects in case these reside exclusively in one enantiomer, smaller doses of medication; simpler and more selective pharmacodynamic profile; less complex pharmacokinetic profile; less side-effects because of the elimination of distomers; reduce drug interactions, fewer adverse effects, one form is more prone to adverse drug interactions; reduced metabolic load over the enzymatic system; potential for an improved therapeutic index and less complex relationship between plasma concentration and effect. Further, the advantages of enantiopure drugs over racemic drugs have varied, depending on the case, and the biological effects of single enantiomer drugs over their counterpart racemic drugs still remain unclear in some cases. These demands of pure enantiomers Cibenzoline succinic acid salt for the clinical studies followed by commercial supply. Thus, we felt a need to develop industrially efficient and economic process for making the enantiomerically pure isomers of Cibenzoline succinic acid salt.

No reports are available in the literature for the preparation enantiomerically pure form of Cibenzoline succinic acid salt except a stereo selective synthesis for (+)-Cibenzoline base staring from enantiomerically pure compound of formula (VI) as shown in Schemes 1 and 2. (*Tetrahedron: Asymmetry* (2009), 20(17), 2065-2071). The major disadvantages of this process are as follows:

a) The preparation of formula (VI) by stereo selective strategy was giving only 76% ee (enantiomeric excess) purity and required extra effort for purification to get (+) Cibenzoline, which is not commercially viable process.

b) The reagents used in the process of (+) Cibenzoline are very expensive and it's very difficult to handle at plant scale. Hence, it is not industrially feasible process.

c) The multi-step process for the preparation of (+) Cibenzoline causes a lot of impurities and it leads to loss of yield.

However, there is no publication that discloses a commercially useful synthesis of (−)-Cibenzoline succinic acid salt and a salt of (−)-Cibenzoline. Hence, there is consequently a need of development of novel methods to sort out issues associated with prior art methods. So, our inventors have developed a method for the preparation of (−)-Cibenzoline and a salt thereof. The present disclosure provides a simple and cost effective industrially applicable process with high purity and good yield.

PRIOR ART REFERENCE

Non-Patent Document

Eur J Clin Pharmacol. 1984; 26(3):297-302
Circ J. 2006 May; 70(5):588-92
Tetrahedron: Asymmetry 17 (2006) 3067-3069
Tetrahedron: Asymmetry (2009), 20(17), 2065-2071

DETAILED DESCRIPTION OF THE INVENTION

Technical Problem

The present disclosure provides a novel (−)-Cibenzoline chiral acid salt of formula (IVA).

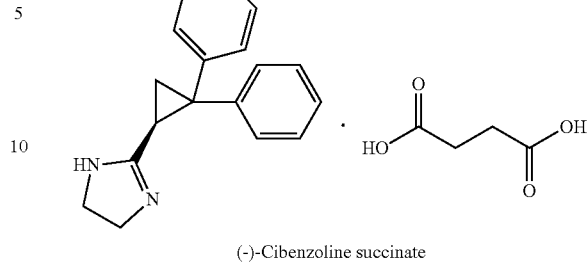

Formula (IVA)

·Chiral acid salt (−)-Cibenzoline Chiral acid salt

The present disclosure provides a novel process for the preparation of (−)-Cibenzoline succinic acid salt of formula (IA) with high yield and purity.

Formula (IA)

(−)-Cibenzoline succinate

The present disclosure provides a crystalline form of (−)-Cibenzoline succinic acid salt of formula (IA).

Formula (IA)

(−)-Cibenzoline succinate

The present disclosure provides a process for the preparation of a crystalline form of (−)-Cibenzoline succinic acid salt of formula (IA).

Formula (IA)

(−)-Cibenzoline succinate

Technical Solution

The present disclosure relates to a process for the preparation of (−)-Cibenzoline succinic acid salt of formula (IA) by employing novel chiral acid salt of formula (IVA).

The present provides a crystalline form of (−)-Cibenzoline succinic acid salt and a process for the preparation thereof.

Formula (IA)

(−)-Cibenzoline succinate

Formula (IVA)

(−)-Cibenzoline Chiral acid salt

The one embodiment of the present invention provides a novel of (−)-Cibenzoline chiral acid salt of formula (IVA).

Formula (IVA)

(−)-Cibenzoline Chiral acid salt

The second embodiment of the present invention provides a novel process for the preparation of enantiomerically pure (−)-Cibenzoline succinic acid salt of formula (IA), Formula (IA)

(−)-Cibenzoline succinate which comprises the steps of:
a) a step of preparing the racemic Cibenzoline free base of formula (III) by treating the racemic Cibenzoline succinic acid salt of formula (II) with a base;

Formula (II)

Formula (III)

b) a step of obtaining racemic Cibenzoline·chiral acid salt of formula (IIIA) by treating the racemic Cibenzoline free base of formula (III) with a chiral acid in the presence of solvent;

Formula (IIIA)

-racemic Cibenzoline Chiral acid salt c) a step of isolating the (−)-Cibenzoline·chiral acid salt of formula (IVA);

Formula (IVA)

(−)-Cibenzoline Chiral acid salt d) a step of preparing the (−)-Cibenzoline free base of formula (VA) by neutralizing the (−)-Cibenzoline·chiral acid salt of formula (IVA) with a base; and

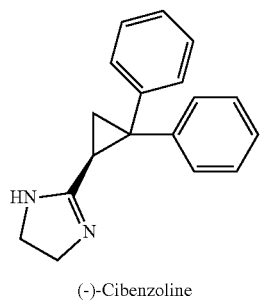

(−)-Cibenzoline

Formula (VA)

e) a step of preparing the (−)-Cibenzoline succinic acid salt of formula (IA) by treating the (−)-Cibenzoline free base of formula (VA) with succinic acid in presence of solvent.

The third embodiment of the present invention provides a crystalline form of (−)-Cibenzoline succinic acid salt of formula (IA).

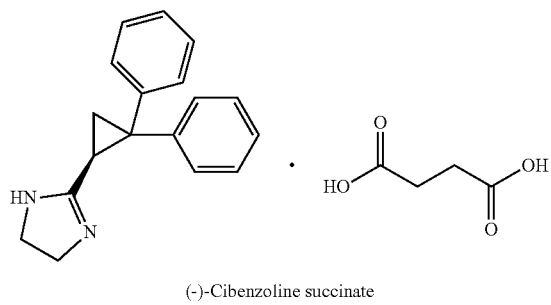

(−)-Cibenzoline succinate

Formula (IA)

The fourth embodiment of the present invention provides a process for the preparation of a crystalline form of (−)-Cibenzoline succinic acid salt, which comprises the steps of:
a) a step of preparing a mixture by mixing a solution 1 including (−)-Cibenzoline free base and a solution 2 including succinic acid; and
b) a step of cooling the mixture.

The fifth embodiment of the present invention provides a process for the preparation of a crystalline form of (−)-Cibenzoline succinic acid salt, which comprises the steps of:
a') a step of preparing a mixture including (−)-Cibenzoline succinic acid salt by reacting (−)-Cibenzoline free base with succinic acid in the presence of a straight or branched C1-C5 alcohol; and
b') a step of cooling the resultant mixture to obtain solid (−)-Cibenzoline succinic acid salt.

The sixth embodiment of the present invention provides a pharmaceutical composition comprising an effective amount of a crystalline form of (−)-Cibenzoline succinic acid salt of formula (IA).

A Process for the Preparation of (−)-Cibenzoline Succinic Acid Salt of Formula (IA) by Employing Novel Chiral Acid Salt of Formula (IVA).

The present disclosure relates to a process for the preparation of (−)-Cibenzoline succinic acid salt of formula (IA) by employing novel chiral acid salt of formula (IVA).

The present provides a crystalline form of (−)-Cibenzoline succinic acid salt and a process for the preparation thereof.

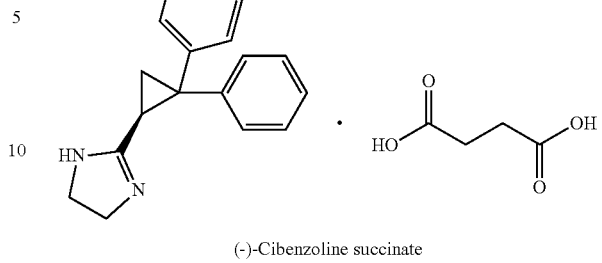

(−)-Cibenzoline succinate

Formula (IA)

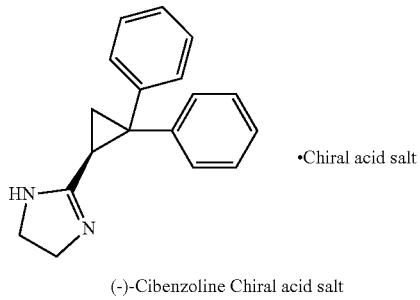

•Chiral acid salt (−)-Cibenzoline Chiral acid salt

Formula (IVA)

The one embodiment of the present invention provides a novel (−)-Cibenzoline·chiral acid salt of formula (IVA), Formula (IVA)

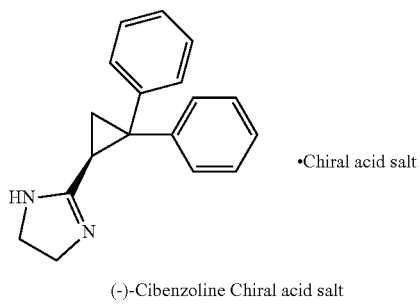

•Chiral acid salt (−)-Cibenzoline Chiral acid salt wherein the chiral acid is one selected from the group consisting of L-(+)-Tartaric acid, D-(−)-Tartaric acid, (R)-(−)-Mandelic acid, (S)-(+)-Mandelic acid, Dibenzoyl-L-tartaric acid, (+)-2,3-Dibenzoyl-D-tartaric acid, (−)-O,O'-Dibenzoyl-L-tartaric acid monohydrate, (+)-O,O-Dibenzoyl-D-tartaric acid monohydrate, (−)-O,O'-Dibenzoyl-L-tartaric acid mono(dimethylamide), Di-p-toluoyl-D-tartaric acid monohydrate, Di-p-toluoyl-L-tartaric acid monohydrate, (−)-O,O'-Di-p-toluoyl-L-tartaric acid, (+)-O,O'-Di-p-toluoyl-D-tartaric acid, D-Glutamic acid, L-Glutamic acid, L-(−)-Malic acid, D-(+)-Malic acid, (−)-Menthyloxyacetic acid, (+)-Menthyloxyacetic acid, (R)-(+)-α-Methoxy-α-trifluoromethylphenylacetic acid, (S)-(−)-α-Methoxy-α-trifluoromethylphenylacetic acid, (R)-(−)-5-Oxo-2-tetrahydrofurancarboxylic acid, (S)-(+)-5-Oxo-2-tetrahydrofurancarboxylic acid, (R)-(+)-N-(1-Phenylethyl)phthalamic acid, (S)-(−)-N-(1-Phenylethyl)phthalamic acid, (R)-(−)-2-Phenylpropionic acid, (S)-(+)-2-Phenylpropionic acid, L-Pyroglutamic acid, D-Pyroglutamic acid, D-(−)-Quinic acid, L-(+)-Quinic acid, L-Aspartic acid, D-Aspartic acid, (R)-1,4-Benzodioxane-2-carboxylic acid, (S)-1,4-Benzodioxane-2-carboxylic acid, N,N-Bis[(S)-(−)-1-phenylethyl]phthalamic acid, N,N-Bis[(R)-(+)-1-phenylethyl]phthalamic acid, (1S)-(+)-3-Bromocamphor-10-sulfonic acid hydrate, (1R)-(−)-3-Bromocamphor-10-sulfonic acid hydrate, (1S)-(−)-Camphanic acid, (1R)-(+)-Camphanic acid, (1R,3S)-(+)-Camphoric acid, (1S,3R)-(−)-Camphoric acid, (1R)-(−)-10-Camphorsulfonic acid, and (1S)-(+)-10-Camphorsulfonic acid.

The second embodiment of the present invention provides a novel process for the preparation of enantiomerically pure (−)-Cibenzoline succinic acid salt of formula (IA),

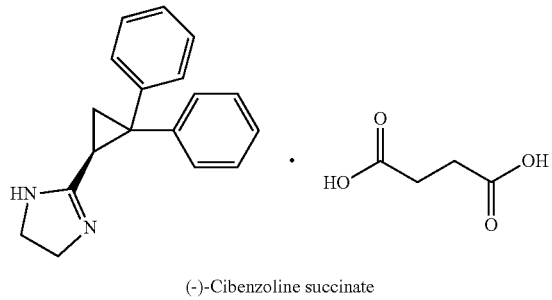

Formula (IA)

(−)-Cibenzoline succinate which comprises the steps of:

a) a step of preparing the racemic Cibenzoline free base of formula (III) by treating the racemic Cibenzoline succinic acid salt of formula (II) with a base;

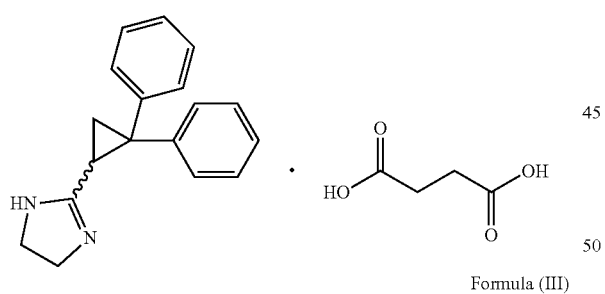

Formula (II)

Formula (III)

b) a step of obtaining racemic Cibenzoline·chiral acid salt of formula (IIIA) by treating the racemic Cibenzoline free base of formula (III) with a chiral acid in the presence of solvent;

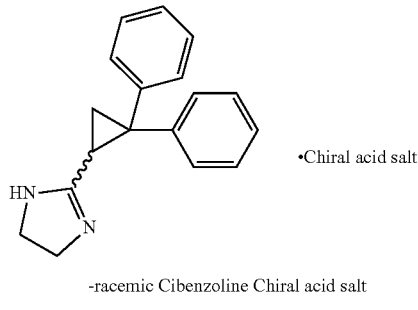

Formula (IIIA)

-racemic Cibenzoline Chiral acid salt c) a step of isolating (−)-Cibenzoline·chiral acid salt of formula (IVA);

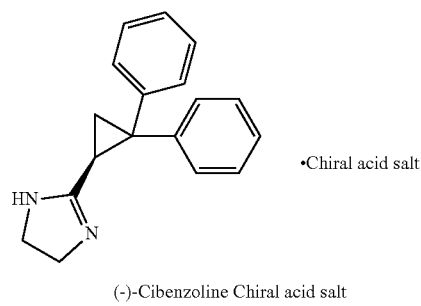

Formula (IVA)

(−)-Cibenzoline Chiral acid salt d) a step of preparing (−)-Cibenzoline free base of formula (VA) by neutralizing the (−)-Cibenzoline·chiral acid salt of formula (IVA) with a base; and

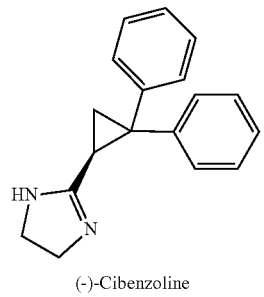

Formula (VA)

(−)-Cibenzoline e) a step of preparing (−)-Cibenzoline succinic acid salt of formula (IA) by treating the (−)-Cibenzoline free base of formula (VA) with succinic acid in the presence of solvent.

The process according to the embodiment of the present invention enables the preparation of (−)-Cibenzoline succinic acid salt of formula (IA) with significantly high chiral purity of pharmaceutically acceptable grade in high yield and therefore is suitable for mass production and economical.

According to the embodiment, the racemic Cibenzoline chiral acid salt of formula (IIIA) of the step (b) may include (+)-Cibenzoline·chiral acid salt and (−)-Cibenzoline·chiral acid salt, wherein (+)-Cibenzoline·chiral acid salt and (−)-Cibenzoline·chiral acid salt may be diastereomers of each other. For example, if the chiral acid is D-tartaric acid, the racemic Cibenzoline·chiral acid salt of formula (IIIA) may be racemic Cibenzoline-D-tartaric acid salt, wherein the racemic Cibenzoline-D-tartaric acid salt may include (+)-Cibenzoline-D-tartaric acid salt and (−)-Cibenzoline-D-tartaric acid salt, which are diastereomers of each other.

According to the embodiment, the present invention comprises treating the racemic Cibenzoline succinic acid salt of formula (II) with a base over 0-30 minutes at 0-30° C. to produce the racemic Cibenzoline free base of formula (III).

According to the embodiment, the present invention comprises treating the racemic Cibenzoline free base of formula (III) with a chiral acid at a suitable temperature in the presence of solvent to obtain the racemic Cibenzoline·chiral acid salts of formula (IIIA), wherein the temperature for the reaction is about 20-65° C. and the reaction is carried out for 30 minutes to 6 hours.

According to the embodiment, the (−)-Cibenzoline·chiral acid salt of formula (IVA) may be isolated by techniques such as filtration or centrifugation and the like.

According to the embodiment, the (−)-Cibenzoline·chiral acid salt of formula (IVA) may be further dried by using a tray dryer, vacuum oven, fluidized bed dryer and spin flash dryer.

According to the embodiment, the process may further comprise a step of purifying the (−)-Cibenzoline·chiral acid salt of formula (IVA) by using various methods like crystallization, precipitation, centrifugation and the like.

According to the embodiment, the present invention comprises a step of preparing the (−)-Cibenzoline free base of formula (VA) by neutralizing the (−)-Cibenzoline·chiral acid salt of formula (IVA) with a base, wherein the neutralizing reaction is carried out at a temperature of 10-50° C. for 30 minutes to 5 hours.

According to the embodiment, the present invention comprises a step of treating the (−)-Cibenzoline free base of formula (VA) with succinic acid at 0-65° C. and stirring for 10 minutes to 5 hours to produce the (−)-Cibenzoline succinic acid salt of formula (IA).

According to the embodiment, the present invention comprises a step of obtaining optically pure (−)-Cibenzoline succinic acid salt of pharmaceutically acceptable grade by recrystallizing the (−)-Cibenzoline succinic acid salt from solvents.

The isolated optically pure (−)-Cibenzoline succinic acid salt is dried by using various techniques like a tray dryer, vacuum oven, fluidized bed dryer and spin flash dryer.

According to the embodiment of the present invention, wherein the chiral acid is selected from the group consisting of L-(+)-Tartaric acid, D-(−)-Tartaric acid, (R)-(−)-Mandelic acid, (S)-(+)-Mandelic acid, Dibenzoyl-L-tartaric acid, (+)-2,3-Dibenzoyl-D-tartaric acid, (−)-O,O'-Dibenzoyl-L-tartaric acid monohydrate, (+)-O,O-Dibenzoyl-D-tartaric acid monohydrate, (−)-O,O'-Dibenzoyl-L-tartaric acid mono(dimethylamide), Di-p-toluoyl-D-tartaric acid monohydrate, Di-p-toluoyl-L-tartaric acid monohydrate, (−)-O,O'-Di-p-toluoyl-L-tartaric acid, (+)-O,O'-Di-p-toluoyl-D-tartaric acid, (+)-O,O'-Di-p-toluoyl-D-tartaric acid, D-Glutamic acid, L-Glutamic acid, L-(−)-Malic acid, D-(+)-Malic acid, (−)-Menthyloxyacetic acid, (+)-Menthyloxyacetic acid, (R)-(+)-α-Methoxy-α-trifluoromethylphenylacetic acid, (S)-(−)-α-Methoxy-α-trifluoromethylphenylacetic acid, (R)-(−)-5-Oxo-2-tetrahydrofurancarboxylic acid, (S)-(+)-5-Oxo-2-tetrahydrofurancarboxylic acid, (R)-(+)-N-(1-Phenylethyl)phthalamic acid, (S)-(−)-N-(1-Phenylethyl)phthalamic acid, (R)-(−)-2-Phenylpropionic acid, (S)-(+)-2-Phenylpropionic acid, L-Pyroglutamic acid, D-Pyroglutamic acid, D-(−)-Quinic acid, L-(+)-Quinic acid, L-Aspartic acid, D-Aspartic acid, (R)-1,4-Benzodioxane-2-carboxylic acid, (S)-1,4-Benzodioxane-2-carboxylic acid, N,N-Bis[(S)-(−)-1-phenylethyl]phthalamic acid, N,N-Bis[(R)-(+)-1-phenylethyl]phthalamic acid, (1S)-(+)-3-Bromocamphor-10-sulfonic acid hydrate, (1R)-(−)-3-Bromocamphor-10-sulfonic acid hydrate, (1S)-(−)-Camphanic acid, (1R)-(+)-Camphanic acid, (1R,3S)-(+)-Camphoric acid, (1S,3R)-(−)-Camphoric acid, (1R)-(−)-10-Camphorsulfonic acid, and (1S)-(+)-10-Camphorsulfonic acid.

According to the embodiment of the present invention, wherein the base is selected from an inorganic base like alkali metal hydroxides, such as sodium hydroxide, lithium hydroxide or potassium hydroxide and the like, or alkali metal carbonates, such as cesium carbonate, sodium carbonate, potassium carbonate or lithium carbonate and the like, or alkali metal bicarbonates such as sodium bicarbonate or potassium bicarbonate and the like or mixtures thereof.

According to the embodiment of the present invention, wherein the solvent is selected from alcohols, such as methanol, ethanol, n-propanol, isopropanol, n-butanol, tert-butanol and the like, or esters, such as ethylacetate, methylacetate, butyl acetate, isopropyl acetate, methoxy ethyl acetate and the like, or aliphatic hydrocarbons, such as heptane, hexane and the like, or ketones, such as acetone, methyl isobutyl ketone, 2-pentanone, ethylmethylketone, diethylketone and the like, or aromatic hydrocarbons, such as benzene, toluene, xylene, chlorobenzene and the like, or halogenated hydrocarbons, such as chloroform, dichloromethane and the like, or ethers, such as methyl tert-butyl ether, diethyl ether, tetrahydrofuran, dioxane and the like, or aprotic polar solvents such as dimethylformamide, dimethylsulfoxide, acetonitrile or water and or mixtures thereof.

The present invention provides a process for the preparation of (−)-Cibenzoline succinic acid salt with high optical purity by using tartaric acid.

The process for the preparation of (−)-Cibenzoline succinic acid salt according to the embodiment of the present invention includes the following steps:

A step of obtaining a mixture including racemic Cibenzoline-D-tartaric acid salt by reacting racemic Cibenzoline free base of formula (III) with D-tartaric acid in the presence of a solvent; and

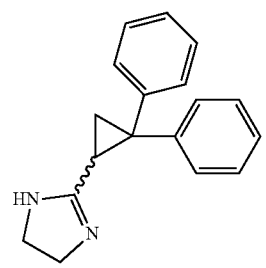

Formula (III)

A step of isolating (−)-Cibenzoline-D-tartaric acid salt from the mixture including the racemic Cibenzoline-D-tartaric acid salt.

In embodiments of the present invention, the racemic Cibenzoline-D-tartaric acid salt may be prepared in the presence of a solvent.

In embodiments of the present invention, the step of preparing racemic Cibenzoline-D-tartaric acid salt in the presence of the solvent may include the following steps:

A step of preparing a mixture by adding a solution 2 including D-tartaric acid to a solution 1 including racemic Cibenzoline free base; and A step of preparing the racemic Cibenzoline-D-tartaric acid salt by adding an organic solvent dropwise to the mixture.

In embodiments of the present invention, the solution 2 may be slowly added dropwise to the solution 1 in the step of preparing the mixture.

In embodiments of the present invention, the additional organic solvent may be slowly added dropwise to the mixture in the step of adding the organic solvent to the mixture.

In embodiments of the present invention, the solution 1 may be prepared by dissolving racemic Cibenzoline free base in acetonitrile and the solution 2 may be prepared by dissolving D-tartaric acid in water.

In embodiments of the present invention, the additional organic solvent may be methyl tert butyl ether.

In embodiments of the present invention, the solvent may be acetonitrile, water, and methyl tert butyl ether in the step of preparing racemic Cibenzoline-D-tartaric acid salt in the presence of the solvent.

In embodiments of the present invention, the volumetric ratio between acetonitrile and methyl tert butyl ether may be about 0.5:1 to 1.5:1, particularly, about 0.7:1 to 1.3:1, in the step of preparing the racemic Cibenzoline-D-tartaric acid salt in the presence of the solvent. For example, the volumetric ratio between acetonitrile and methyl tert butyl ether may be approximately 1:1 or 1:1.

In embodiments of the present invention, the reaction after adding the additional organic solvent may be carried out at room temperature, and it may be heated to a temperature of 40-60° C. after the reaction at room temperature to accelerate reaction, more particularly approximately equal to or higher than 45° C., or more particularly approximately equal to or higher than 50° C., or even more particularly approximately 50-55° C.

In embodiments of the present invention, the additional organic solvent may be added dropwise for 15 minutes or more; the dropwise addition time may differ depending on the scale of reaction, but it can be added dropwise for 20 minutes, 30 minutes, 1 hour, and 2 hours. In addition, after the dropwise addition of the additional organic solvent, it may be stirred for 2 hours or more; the stirring time may differ depending on the scale of reaction, but it can be stirred for 2.5 hours, 3 hours, 3.5 hours, and 4 hours.

In embodiments of the present invention, the step of isolating (−)-Cibenzoline-D-tartaric acid salt from the mixture including the racemic Cibenzoline D-tartaric acid salt may be the step of obtaining solid (−)-Cibenzoline-D-tartrate salt from the mixture including the racemic Cibenzoline D-tartaric acid salt.

In embodiments of the present invention, the step of isolating (−)-Cibenzoline-D-tartaric acid salt from the mixture including the racemic Cibenzoline D-tartaric acid salt may further include:

A step of heating the mixture including the racemic Cibenzoline D-tartaric acid salt; and A step of cooling the mixture after the heating step.

In embodiments of the present invention, the step of heating may be carried out at a temperature of approximately equal to or higher than 45° C., or particularly approximately equal to or higher than 50° C., or even more particularly approximately 50-55° C.

In embodiments of the present invention, the step of isolating (−)-Cibenzoline-D-tartaric acid salt may further include a stirring step after the heating step. The stirring step may be carried out for 30 or more minutes, and the duration of stirring may differ depending on the scale of reaction, but it can be stirred for 1 hour, 2 hours, 3 hours, 4 hours, and 5 hours.

In embodiments of the present invention, the cooling step may be carried out at a temperature of approximately 20-30° C., particularly approximately 25-30° C.

In embodiments of the present invention, the isolating (−)-Cibenzoline-D-tartaric acid salt may additionally include a stirring step after the cooling step.

The stirring may be carried out for 30 or more minutes, and the duration of stirring may differ depending on the scale of reaction, but it can be stirred for 1 hour, 2 hours, 3 hours, 4 hours, and 5 hours.

In embodiments of the present invention, the process for the preparation of (−)-Cibenzoline succinic acid salt may further include the step of purifying the (−)-Cibenzoline-D-tartaric acid salt.

In embodiments of the present invention, the racemic Cibenzoline free base may be prepared by reacting the racemic Cibenzoline succinic acid salt with a base.

In embodiments of the present invention, the type of the base may be as described above.

In embodiments of the present invention, the process for the preparation of (−)-Cibenzoline succinic acid salt may further include the following steps:

A step of obtaining (−)-Cibenzoline free base by reacting (−)-Cibenzoline-D-tartaric acid salt with a base; and A step of reacting the (−)-Cibenzoline free base with succinic acid.

In embodiments of the present invention, the type of the base may be as described above.

The (−)-Cibenzoline succinic acid salt obtained by the process according to the embodiment of the present invention has pharmaceutically acceptable grade optical purity and may be a single crystalline form.

The embodiment of the present invention provides a pharmaceutical composition comprising (−)-Cibenzoline chiral acid salt of formula (IVA), a pharmaceutically acceptable carrier, a pharmaceutically acceptable diluent, or a pharmaceutically acceptable excipient.

Preparation of Salts of (−)-Cibenzoline Other than (−)-Cibenzoline Succinic Acid Salt and Chiral Acid Salt A pharmaceutically acceptable salt of (−)-Cibenzoline may be prepared through a novel process the preparation of an enantiomerically pure (−)-Cibenzoline succinic acid salt of the present invention or a process acknowledged as being identical to said process.

The (−)-Cibenzoline free base, (−)-Cibenzoline chiral acid salt comprising (−)-Cibenzoline succinic acid salt, (−)-Cibenzoline-D-tartaric acid salt, which are obtained by the process according to the embodiment of the present invention may undergo an additional reaction to prepare a pharmaceutically acceptable salt of (−)-Cibenzoline.

The "pharmaceutically acceptable salt" includes both inorganic and organic acid salts, for example, but not limited to, hydrochloride salt, sulfate salt, nitrate salt, phosphate salt, acetate salt, trifluoroacetate salt, benzenesulfonate salt, citrate salt.

A Crystalline Form of (−)-Cibenzoline Succinic Acid Salt and a Process for the Preparation Thereof The third embodiment of the present invention provides a crystalline form of (−)-Cibenzoline succinic acid salt of formula (IA).

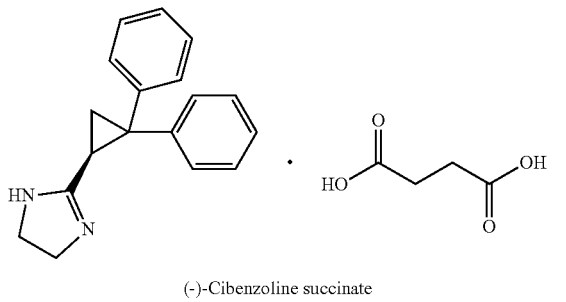

(-)-Cibenzoline succinate

According to the embodiment of the present invention, the crystalline form of (−)-Cibenzoline succinic acid salt has an X-ray powder diffraction (XRPD) pattern including diffraction peaks at 11.15°, 14.09°, 17.29°, 22.06°, 22.93°, and 24.25° (2θ).

According to the embodiment of the present invention, the crystalline form of (−)-Cibenzoline succinic acid salt has an X-ray powder diffraction (XRPD) pattern including diffraction peaks at 11.2°, 14.1°, 17.3°, 18.2°, 21.4°, 22.1°, 23.0°, 24.3° and 26.4° (2 θ±0.2°).

According to the embodiment of the present invention, in addition to XRPD diffraction peaks at 11.2°, 14.1°, 17.3°, 22.1°, 23.0°, and 24.3° (2θ±0.2°), the crystalline form of (−)-Cibenzoline succinic acid salt may have an XRPD pattern including one or more diffraction peaks selected from the group consisting of 17.6°, 18.2°, 21.4°, 26.4°, and 29.5° (2θ±0.2°).

According to the embodiment of the present invention, in addition to XRPD diffraction peaks at 11.15°, 14.09°, 17.29°, 22.06°, 22.93°, and 24.25° (2θ), the crystalline form of (−)-Cibenzoline succinic acid salt may have an XRPD pattern including one or more diffraction peaks selected from the group consisting of 17.59°, 18.15°, 21.37°, 26.36°, and 29.50° (2θ).

According to the embodiment of the present invention, the crystalline form of (−)-Cibenzoline succinic acid salt may have an XRPD pattern including diffraction peaks at 8.99°, 11.15°, 13.36°, 14.09°, 14.30°, 17.29°, 17.59°, 18.15°, 19.81°, 21.37°, 22.06°, 22.93°, 24.25°, 25.41°, 26.36°, 27.59°, and 29.50° (2θ) as described in Table 1 below.

TABLE 1

(−)-Cibenzoline succinate

| 2-theta (°) | Intensity % |
|---|---|
| 8.99 | 3.5 |
| 11.15 | 100 |
| 13.36 | 3.3 |
| 14.09 | 24.9 |
| 14.30 | 2.9 |
| 17.29 | 8.2 |
| 17.59 | 5.2 |
| 18.15 | 5.9 |
| 19.81 | 3.1 |
| 21.37 | 7.2 |
| 22.06 | 16.7 |
| 22.93 | 15.8 |
| 24.25 | 20.1 |
| 25.41 | 3.0 |
| 26.36 | 7.0 |
| 27.59 | 2.9 |
| 29.50 | 2.7 |

According to the embodiment of the present invention, the crystalline form of (−)-Cibenzoline succinic acid salt may have an XRPD pattern with diffraction peaks at 5.31°, 10.05°, 8.99°, 11.15°, 13.36°, 14.09°, 14.30°, 17.29°, 17.59°, 18.15θ, 19.81°, 21.37°, 22.06°, 22.93°, 24.25°, 25.41°, 25.94°, 26.36°, 27.59°, and 29.50° (2θ).

In the embodiments of the present invention, the crystalline form of (−)-Cibenzoline succinic acid salt has an optical rotation of $[\alpha]_D$ −124.47, is a pure optical isomer, and may have an IR spectrum with peaks at 1674.96 cm$^{-1}$ (Acid C=O stretching vibration) and 2954.43 cm$^{-1}$ (sp3 stretching vibration).

According to the embodiment of the present invention, the crystalline form of (−)-Cibenzoline succinic acid salt may have an XRPD pattern of FIG. 1.

According to the embodiment of the present invention, the XRPD pattern might have been be measured by using Cu—K$_\alpha$ or Cu—K$_\beta$ radiation, more particularly, Cu—K$_\alpha$ radiation, even more particularly, Cu—K$_{\alpha 1}$, Cu—K$_{\alpha 2}$, Cu—K$_\beta$, or Cu—K$_{\alpha 1}$ and Cu—K$_{\alpha 2}$ radiation. For example, the XRPD pattern might have been be measured by using Cu—K$_\alpha$ radiation.

According to the embodiment of the present invention, the graph of differential scanning calorimetry (DSC) of the crystalline form of (−)-Cibenzoline succinic acid salt may have an endothermic peak at approximately 187-193° C. at heating rate of 10° C./min, particularly 190.00° C.±2° C., more particularly 190.00° C.±1° C., for example DSC melting endothermic transition peak which starts at about 190.59° C. and reaches its maximum at about 190.78° C. Generally, measurements of the melting point and the endothermic transition temperature provide values that are within a tolerance of ±2° C., or ordinarily ±1° C.

According to the embodiment of the present invention, the graph of differential scanning calorimetry (DSC) of the crystalline form of (−)-Cibenzoline succinic acid salt may be the same as FIG. 2.

According to the embodiment of the present invention, identification by FT-IR of the crystalline form of (−)-Cibenzoline succinic acid salt may have 1674±5 cm$^{-1}$ and 2954±5 cm$^{-1}$, for example, 1674 cm$^{-1}$ and 2953 cm$^{-1}$.

According to the embodiment of the present invention, FT-IR spectrum of the crystalline form of (−)-Cibenzoline succinic acid salt may be the same as FIG. 3.

According to the embodiment of the present invention, particle size distribution of the crystalline form of (−)-Cibenzoline succinic acid salt may have from $D_{10}$: more than 10.0 μm, $D_{50}$: more than 150 μm and $D_{90}$: less than 300.0 μm, for example, $D_{10}$: 15.2 μm, $D_{50}$: 104.0 μm and $D_{90}$: 265.0 μm. The particle size of the crystalline form of (−)-Cibenzoline succinic acid salt may have confirmed very fine. The crystal form can proceed directly to the formulation without further processing, such as milling.

According to the embodiment of the present invention, a water solubility of the crystalline form of (−)-Cibenzoline succinic acid salt may have from 41.0±1 mg/ml (at 25±3° C.). The solubility may vary from pH. It may have been 65.0±1 mg/ml (at 25±3° C.) in 0.1N HCl and 45.0±1 mg/ml (at 25±3° C.) in pH 6.8 phosphate.

The crystalline form of (−)-Cibenzoline succinic acid salt of the present invention may be defined in terms of additional physical properties such as solid C-NMR, a specific diffraction peak at crystal lattice plane spacing, the shape of solid crystalline form in microscopic image, or particle size of solid crystalline form in microscopic image or particle size distribution (D-value).

In addition, the crystalline form of (−)-Cibenzoline succinic acid salt of the present invention may have low hygroscopicity, may be remarkably stable at the accelerated conditions and long-term storage conditions and may be stably maintained with no change in content for long term. Accordingly, the crystalline form of (−)-Cibenzoline succinic acid salt of the present invention may be obtained as a raw material having high purity and may maintain high purity and its crystalline form for long term even when stored for long periods of time.

In addition, the crystalline form of (−)-Cibenzoline succinic acid salt of the present invention may be obtained in high purity and yield without complicated purification process, such as column chromatography, and may be therefore easily applicable for mass production and commercial purposes.

Besides, the crystalline form of (−)-Cibenzoline succinic acid salt of the present invention may remarkably stable and therefore may have an excellent pharmacological effect, making it useful as an active ingredient for preventing or treating a disease selected from the group consisting of heart disease, arrhythmia heart disease, and heart failure.

The crystalline form of (−)-Cibenzoline succinic acid salt may be formulated into a form selected from the group consisting of powder, granule, tablet, capsule, suspension, emulsion, syrup, aerosol, ointment, cream, suppository, eye drop, and injection according to conventional formulation methods recognized by those skilled in the art.

The fourth embodiment of the present invention provides a process for the preparation of a crystalline form of (−)-Cibenzoline succinic acid salt of formula (IA).

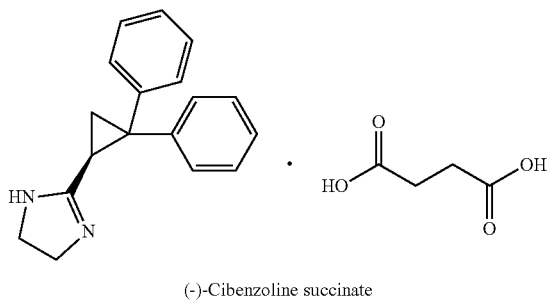

Formula (IA)

(−)-Cibenzoline succinate

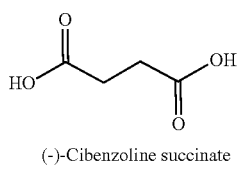

(−)-Cibenzoline succinate

According to the embodiment of the present invention, the process for the preparation of the crystalline form of (−)-Cibenzoline succinic acid salt comprises the following steps of:

a) a step of preparing a mixture by mixing solution 2 including succinic acid and solution 1 including (−)-Cibenzoline free base of formula (VA); and

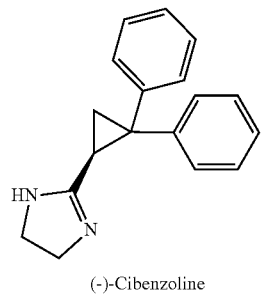

Formula (VA)

(−)-Cibenzoline b) a step of preparing the crystalline form of (−)-Cibenzoline succinic acid salt of formula (IA) by cooling the mixture.

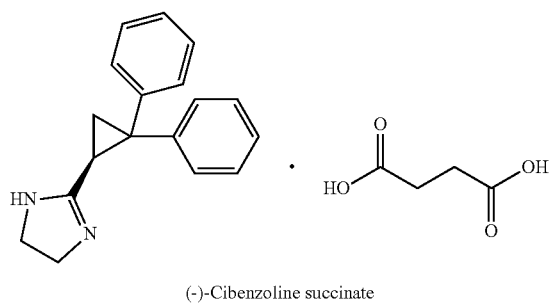

Formula (IA)

(−)-Cibenzoline succinate

According to the embodiment of the present invention, the mixture may be prepared by adding the solution 2 to the solution 1 in the step a).

According to the embodiment of the present invention, the solution 1 may be prepared by dissolving (−)-Cibenzoline free base in a straight or branched C1-C5 alcohol.

According to the embodiment of the present invention, the solution 2 may be prepared by dissolving succinic acid in a straight or branched C1-C5 alcohol.

According to the embodiment of the present invention, the straight or branched C1-C5 alcohol may be methanol, ethanol, straight or branched propanol, straight or branched butanol, straight or branched pentanol, or a mixture thereof, particularly, methanol, ethanol, straight or branched propanol, or a mixture thereof, more particularly methanol, straight or branched propanol, or a mixture thereof.

According to the embodiment of the present invention, the solution 1 may be prepared by using isopropanol as solvent and the solution 2 may be prepared by using methanol as solvent. In this case, the volumetric ratio between isopropanol and methanol may be 1-5:1, more particularly 1-3:1, even more particularly 2:1.

According to the embodiment of the present invention, the mixing in the step a) may be carried out at a temperature of 20-60° C., particularly 20-50° C., more particularly 20-35° C.

According to the embodiment of the present invention, the cooling of the step b) may be carried out at a temperature of 0-10° C.

According to the embodiment of the present invention, filtration and drying steps may be additionally carried out following cooling in the step b) to obtain a solid crystalline form of (−)-Cibenzoline succinic acid salt.

According to the embodiment of the present invention, the mixing of step a) may be carried out for 5 minutes or more, and the duration of stirring may differ depending on the scale of reaction, but it can be stirred for 10 minutes, 20 minutes, 30 minutes, and 1 hour.

According to the embodiment of the present invention, the cooling of step b) may be carried out for 1 hour or more, and the duration of stirring may differ depending on the scale of reaction but it can be stirred for 2 hours, 3 hours, 4 hours, and 5 hours.

The fifth embodiment of the present invention provides a process for the preparation of a crystalline form of (–)-Cibenzoline succinic acid salt of formula (IA).

According to the embodiment of the present invention, the process for the preparation of a crystalline form of (–)-Cibenzoline succinic acid salt including the following steps of:

a') a step of preparing a resultant mixture by reacting (–)-Cibenzoline free base with succinic acid in the presence of a straight or branched C1-C5 alcohol, and b') a step of obtaining solid (–)-Cibenzoline succinic acid salt by cooling the resultant mixture.

According to the embodiment of the present invention, the straight or branched C1-C5 alcohol may be methanol, ethanol, straight or branched propanol, straight or branched butanol, straight or branched pentanol, or a mixture thereof, more particularly methanol, ethanol, straight or branched propanol, or a mixture thereof, even more particularly methanol, straight or branched propanol, or a mixture thereof.

According to the embodiment of the present invention, the straight or branched C1-C5 alcohol may be isopropanol and methanol. The volumetric ration between isopropanol and methanol may be 1-5:1, more particularly 1-3:1, even more particularly 2:1.

According to the embodiment of the present invention, the mixing in the step a') may be carried out at a temperature of 20-60° C., more particularly 20-50° C., even more particularly 20-35° C. at room temperature.

According to the embodiment of the present invention, the cooling of the step b') may be carried out at a temperature of 0-10° C. and the cooling forms a solid form of Cibenzoline succinic acid salt crystalline form.

According to the embodiment of the present invention, filtration and drying steps may be additionally carried out following cooling in the step b') to obtain a solid Cibenzoline succinic acid salt crystalline form.

According to the embodiment of the present invention, the mixing of step a') may be carried out for 5 or more minutes, and the duration of stirring may differ depending on the scale of reaction but it can be stirred for 10 minutes, 20 minutes, 30 minutes, and 1 hour.

According to the embodiment of the present invention, the cooling of step b') may be carried out for 1 or more hours, and the duration of stirring may differ depending on the scale of reaction but it can be stirred for 2 hours, 3 hours, 4 hours, and 5 hours.

A Pharmaceutical Composition Comprising a Crystalline Form of (–)-Cibenzoline Succinic Acid Salt The sixth embodiment of the present invention provides a pharmaceutical composition comprising an effective amount of a crystalline form of (–)-Cibenzoline succinic acid salt of formula (IA) as an active ingredient together with a pharmaceutically acceptable carrier, diluent, or excipient.

The composition may be formulated into a form selected from the group consisting of powder, granule, tablet, capsule, suspension, emulsion, syrup, aerosol, ointment, cream, suppository, eye drop, and injection according to conventional formulation methods recognized by those skilled in the art.

The composition may be effective in preventing or treating at least one disease selected from the group consisting of heart disease, arrhythmia heart disease, and heart failure.

The pharmaceutical composition according to embodiment of the present invention may be formulated by using a pharmaceutically acceptable carrier according to a method that can be practiced by those skilled in the art without difficulty and prepared in a unit dosage form or supplied in a multi-dose container.

The content of additive included in the pharmaceutical composition according to embodiment of the present invention is not specifically restricted and may be adjusted appropriately within a scope that is conventionally applied for formulation.

The pharmaceutical composition according to embodiment of the present invention may be administered to a patient in an effective amount via the various routes, e.g., the oral route or the non-oral route. Preferably, the inventive composition is prepared in the oral administration form such as a capsule, a tablet, a dispersion, and a suspension.

The preferable dose volume and duration of the pharmaceutical composition according to embodiment of the present invention may vary depending on a patient's weight, age, gender, health condition, diet, administration time, administration method, administration duration or interval, excretion rate, constitutional specificity, the property of formulation, and the severity of disease and be selected appropriately by those skilled in the art.

Effects of the Invention (–)-Cibenzoline succinic acid salt according to the present invention can be prepared with high chiral purity though a simple process, is affordable, and is highly advantageous in mass production.

In addition, a crystalline form of (–)-Cibenzoline succinic acid salt of the present invention has low hygroscopicity, is remarkably stable according to accelerated condition and long-term storage condition, and can be stably maintained with no change in the amount for long term. Accordingly, the crystalline form of (–)-Cibenzoline succinic acid salt of the present invention can be obtained as a raw material having high purity and can maintain its high purity and crystalline form for long term even when stored for long periods of time. Furthermore, the crystalline form of (–)-Cibenzoline succinic acid salt can be obtained with high purity and yield through a simple, affordable and industrially applicable process without requiring additional purification process.

BEST MODE FOR INVENTION

Figure 1:
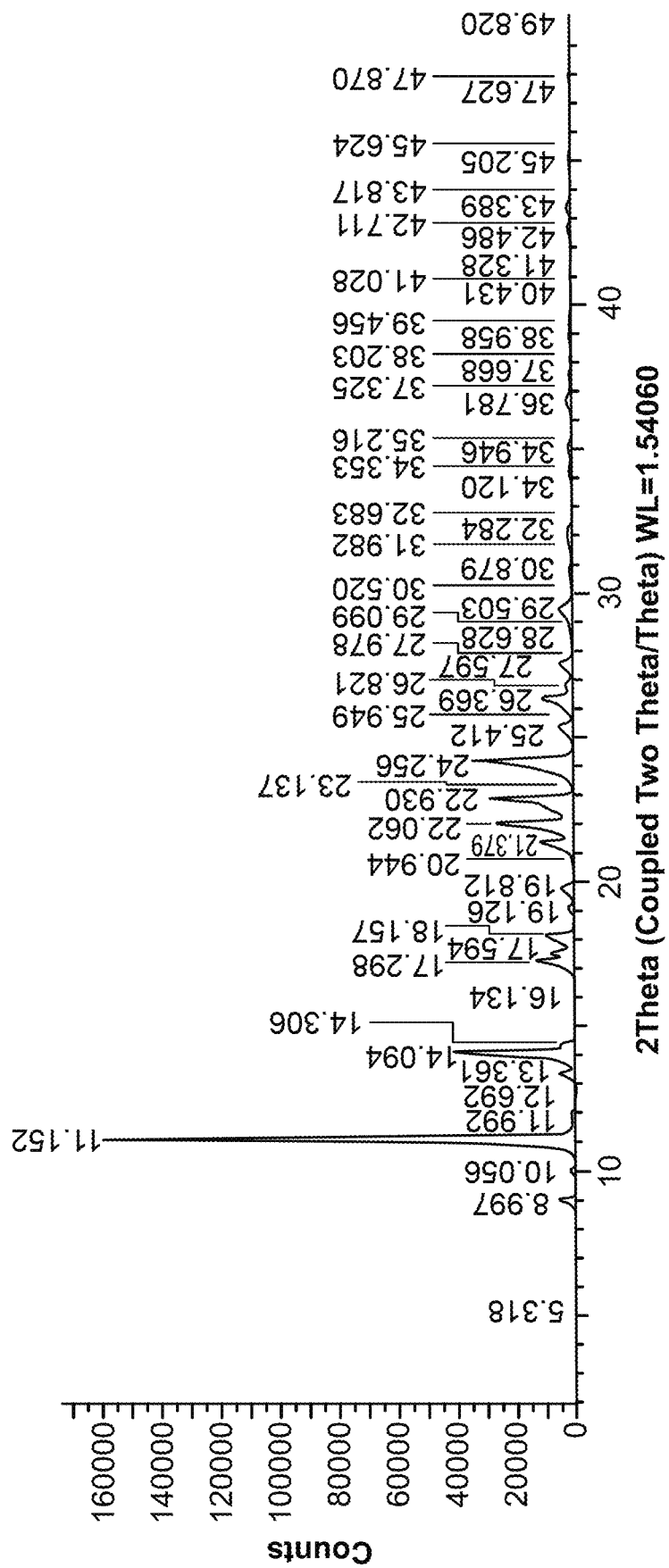
FIG. 1 illustrates the X-ray powder diffraction pattern of a crystalline form of (–)-Cibenzoline succinic acid salt according to Example 4.

The process details of the invention are provided in the examples given below, which are provided by way of illustration only and therefore should not be construed to limit the scope of the invention.

Experimental Procedure

Instrumental Analysis and Measurement Condition
1. Chiral Purity (HPLC) Analysis Chiral purity (e.e) of the prepared compound was measured by high-performance liquid chromatography (HPLC) with measurement conditions as below.

TABLE 2

| HPLC condition | |
|---|---|
| Column | Chiralpak IC, 250 × 4.6 mm, 5 µm, column temperature: 35° C. |
| Mobile phase | a mixture of n-Hexane, Isopropyl alcohol, Ethanol and Diethyl amine in the ratio of 80:10:10:0.1 (v/v/v/v) |
| flow rate | 0.8 mL/min. |
| detection | 220 nm. |
| Instrument details | System make: Shimadzu. LC-2030C, i-services. |

2. $^1$H NMR and $^{13}$C NMR Analysis

The nuclear magnetic resonance spectrum of (−)-Cibenzoline succinic acid salt was obtained by using Bruker advance-III FT-NMR. $^1$H NMR was measured at 400 MHz (in DMSO-D$_6$) and $^{13}$C NMR was measured at 400 MHz (in CD$_3$OD).

3. IR Analysis

IR analysis of (−)-Cibenzoline succinic acid salt was performed on a PerkinElmer spectrum FT-IR spectrophotometer. IR spectrum was recorded by using a KBr disc.

4. Mass Spectral Analysis

Mass spectral analysis of (−)-Cibenzoline succinic acid salt was performed on an Agilent LCQ Fleet Thermo-ion trap mass spectrometer with Electro Spray Ionization (ESI).

5. UV-Visible Spectroscopy Analysis

UV-visible spectroscopy analysis of (−)-Cibenzoline succinic acid salt was performed by using a UV visible spectrophotometer of Perkin-Elmer (model Lambda 25). A solution of 10 µg/ml was prepared by dissolving (−)-Cibenzoline succinic acid salt in methanol as solvent and scanned from 200 nm to 400 nm.

6. Specific Optical Rotation Analysis

Specific optical rotation analysis of a (−)-Cibenzoline succinic acid salt solution whose concentration is 1.401 g/100 ml (in methanol) was performed on Agilent Autopol V, Serial #81225 at room temperature.

EXAMPLE

Example 1. Preparation of (±)-Cibenzoline Free Base

A suspension of (±)-Cibenzoline succinic acid salt (50 g) was stirred in water (200 ml) and basified with 10% sodium hydroxide solution to pH 10.5-10.8 over 30 minutes at 25-30° C. and extracted with ethyl acetate (400 ml). The obtained organic layer was dried over anhydrous sodium sulphate, followed by concentration under reduced pressure (400-20 mmHg) at below 45° C. to afford a white solid as (±)-Cibenzoline free base (30 g).

[Chiral Purity Measured by Chiral HPLC: Mixture of (−)-Cibenzoline 48.76% and (+)-Cibenzoline 51.24%]

Example 2. Preparation of (−)-Cibenzoline-D-tartaric Acid Salt (±)-Cibenzoline free base (15.0 g, Example 1) was dissolved in acetonitrile (250 ml), stirred at 25-30° C. for 15 min and then added D-(−)-tartaric acid (1.0 m. eq.) solution in water (30 ml) over a period of 20 min. at 25-30° C. The resultant mixture was stirred for 30 min, followed by addition of methyl tert butyl ether (MTBE, 250 ml) over a period of 20 min. and then stirred for 2.5 hours at room temperature. The reaction mixture was heated to 50-55° C. and stir for 1 hour and then allowed to cool at 25-30° C. and stir for 1 hour. The obtained solid was filtered and washed with acetonitrile (23 ml) to afford (−)-Cibenzoline-D-tartaric acid salt (6.4 g) with 99.0% chiral purity measured by chiral HPLC. (yield: 41 (w/w) %)

$^1$H-NMR (400 MHz, CD3OD): 7.38 (m, 6H); 7.29 (m, 3H); 7.20 (m, 1H); 4.40 (s, 2H); 3.71 (m, 2H); 3.52 (m, 2H); 2.83 (t, 1H); 2.34 (t, 1H); 1.90 (t, 1H) ppm.

$^{13}$C-NMR (100 MHz, CD3OD): 177.01, 170.68, 144.71, 139.88, 130.73, 129.82, 129.72, 128.90, 128.77, 128.19, 74.21, 45.52, 42.54, 23.02, 20.11.

IR (cm$^{-1}$): 1731.23, 3531.63.

Example 3. Preparation of (−)-Cibenzoline Free Base (−)-Cibenzoline-D-tartaric acid salt (5.0 g, example 2) was added in water (25 ml) and basified with saturated sodium bicarbonate solution (50 ml) at 25-30° C. and extracted with dichloromethane (200 ml). The extracted dichloromethane layer was dried over anhydrous sodium sulphate and followed by distillation under reduced pressure (500-20 mmHg) at below 40° C. to get the semisolid as a (−)-Cibenzoline free base (3.0 g) with $[\alpha]_D$ −153.82 and 99.09% chiral purity measured by chiral HPLC.

Figure 4:
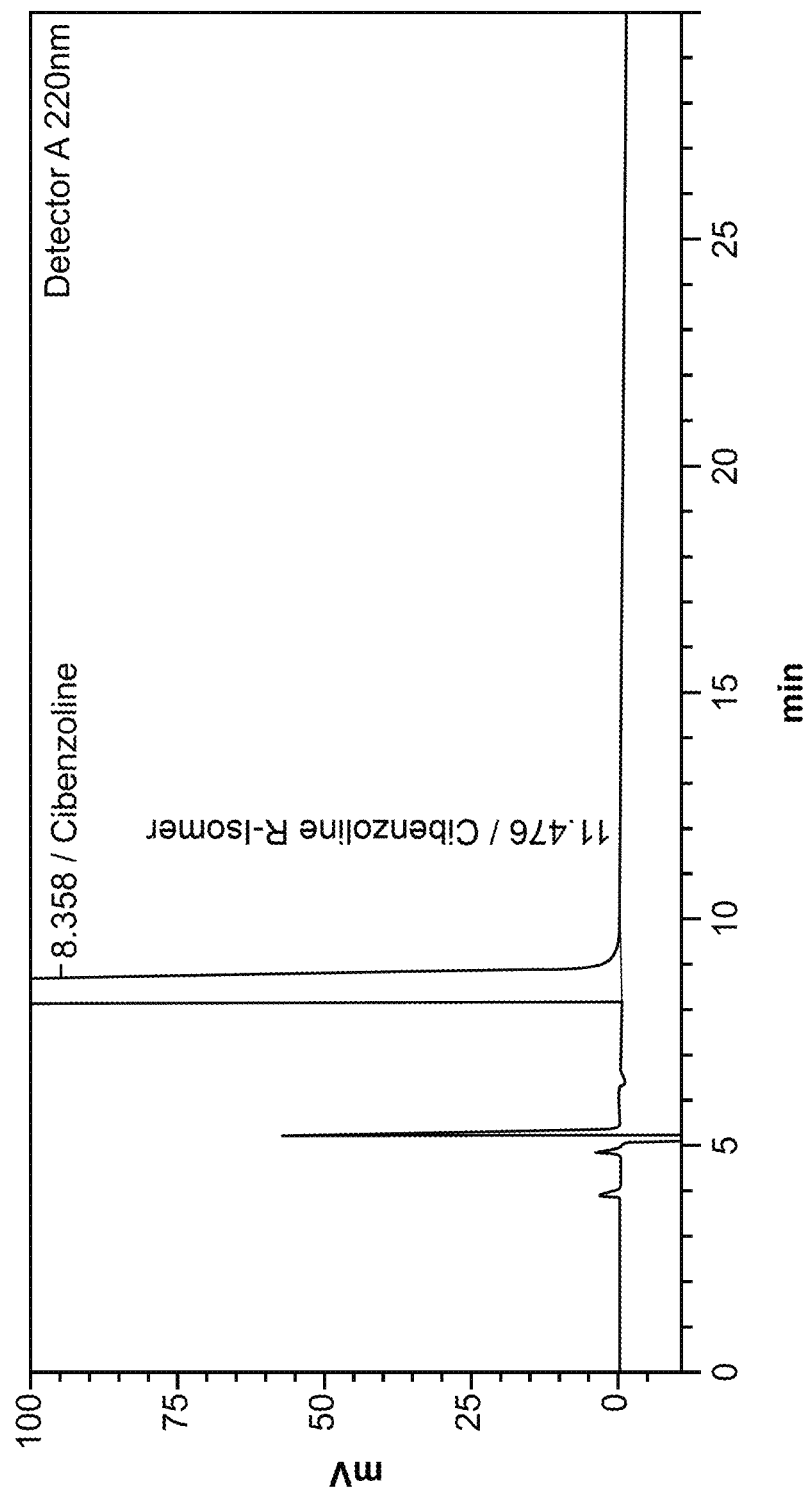
FIG. 4 illustrates high-performance liquid chromatography (HPLC) of (–)-Cibenzoline succinic acid salt according to Example 4.

Example 4. Preparation of (−)-Cibenzoline Succinic Acid Salt (−)-Cibenzoline base (2.5 g, example 3) was dissolved in isopropanol (25 ml) and stirred at 50-55° C., followed by addition of succinic acid (1.0 m. eq.) solution in methanol (12.5 ml) over a period of 10 min and then stirred at 25-30° C. for 30 min, allowed to cooled at 0-5° C. for 1.5 hours. The resultant white solid was filtered, washed with isopropanol (3.75 ml) and then dried at 40-45° C. under vacuum to afford pure (−)-Cibenzoline succinic acid salt (3.2 g) with 99.9% chiral purity measured by chiral HPLC (FIG. 4).

$^1$H-NMR (400 MHz, CD3OD): 7.38 (m, 6H); 7.29 (m, 3H); 7.21 (m, 1H); 3.71 (m, 2H); 3.53 (m, 2H); 2.82 (m, 1H); 2.50 (s, 4H); 2.36 (t, 1H); 1.91 (m, 1H) ppm.

$^{13}$C-NMR (100 MHz, CD3OD): 179.20, 170.55, 141.73, 139.83, 130.70, 129.78, 129.69, 128.84, 128.76, 128.16, 45.41, 42.41, 32.96, 23.00, 21.01 ppm.

Figure 3:
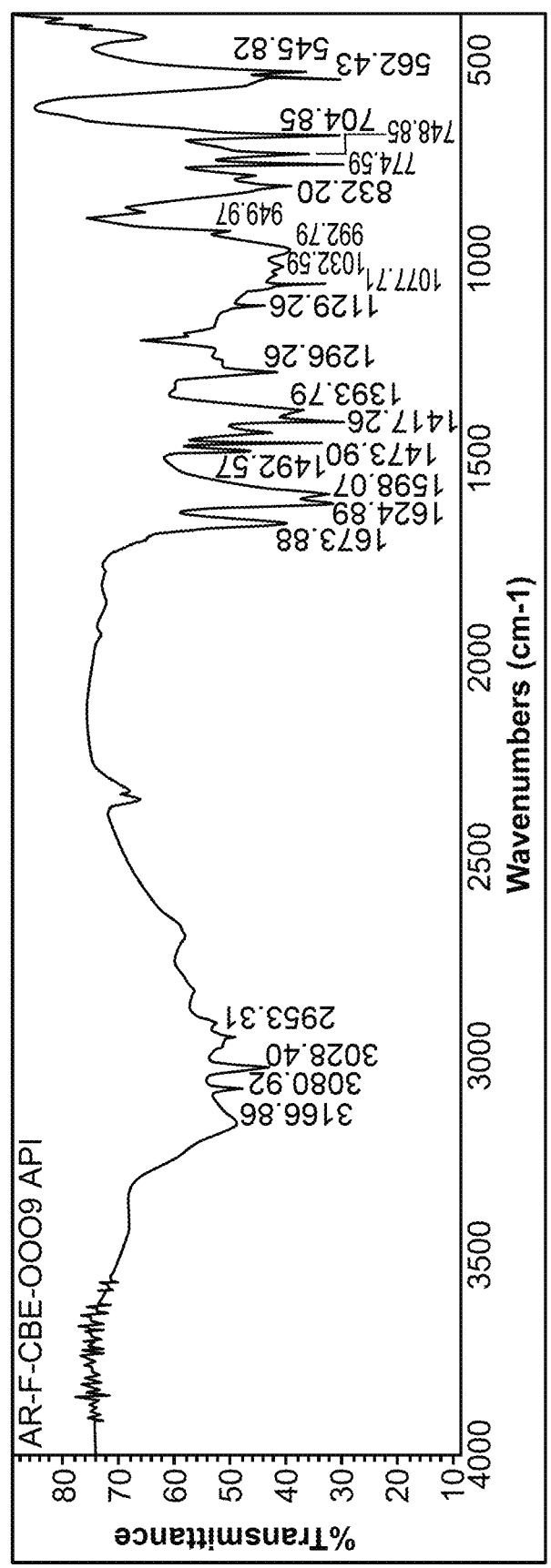
FIG. 3 illustrates FT-IR of (–)-Cibenzoline succinic acid salt according to Example 4.

IR spectrum: 1674.96 cm$^{-1}$ (Acid C=O stretching vibration), 2954.43 cm$^{-1}$ (Sp3 stretching vibration) (FIG. 3).

M.w: 380.44 m/z of (−)-Cibenzoline: 263.35 (theoretical), 263 (observed)

UV absorption: 1.155 absorption at 202.5 nm

Specific Optical Rotation: $[\alpha]_D$ −124.47; Rotation −VE.

Example 5. Preparation of (±) Cibenzoline-L-tartaric Acid Salt (±)-Cibenzoline free base (15.0 g, Example 1) was dissolved in acetonitrile (255 ml), stirred at 25-30° C. for 15 min and then added L-(+) tartaric acid (1.0 m. eq.) solution in water (35 ml) over a period of 15 min at 25-30° C. and stir for 30 min, further added methyl tertiary butyl ether (260 ml) over a period of 20 min and stirred mixture for 2-hours at the same temperature. The obtained mixture was heated to 50-55° C. for 1.5 hours and allowed to cool at 25-30° C. and stir for 1 hour at same temperature. The resultant solid was filtered and washed with acetonitrile (30 ml) to afford of (+)-Cibenzoline-L-tartaric acid salt (6.0 g) with 99% purity by chiral HPLC and then filtrate was distilled out under reduced pressure to get the oil residue of (±)-Cibenzoline-L-tartaric acid salt.
[In which Content Mixture of ~70% (−) Cibenzoline-L-tartaric Acid Salt and ~30% (+) Cibenzoline-L-tartaric Acid Salt]

Example 6. Preparation of (±)-Cibenzoline Free Base (±)-Cibenzoline-L-tartaric acid salt (45 g, Example 5) was added in water (225 ml) and basified with saturated aqueous sodium bicarbonate solution (450 ml) over 30 minutes then extracted with dichloromethane (600 ml). The extracted dichloromethane layer was dried over anhydrous sodium sulphate and followed by distillation under reduced pressure (500-20 mmHg) at below 40° C. to get the semisolid of (±)-Cibenzoline free base (28.0 g).

Example 7. Preparation of (−)-Cibenzoline-D-tartaric Acid Salt (±)-Cibenzoline free base (18 g, example 6) was dissolved in acetonitrile (300 ml) and stirred at 25-30° C. for 15 min, followed by addition of one molar equivalent aqueous D-(−)-tartaric acid (36 ml) over a period of 15 min at 25-30° C. The resultant solution was stirred for 30 min and then added methyl tertiary butyl ether (300 ml) over a period of 20 min, stirred for 2.5 hours at room temperature. The obtained mixture was heated to 50-55° C., stir for 1 hour and then allowed to cool at 25-30° C. The resultant solid was filtered and washed with acetonitrile (27 ml) to afford of (−)-Cibenzoline-D-tartaric acid salt (11.2 g) with 90-99% chiral purity measured by chiral HPLC.

Example 8. Purification of (−)-Cibenzoline-D-tartaric Acid Salt

A suspension of crude (−)-Cibenzoline-D-tartaric acid salt (10.0 g, example 7) in mixture of acetonitrile (55 ml) and water (6.5 ml) at 50-55° C., followed by addition of methyl tert-butyl ether (55 ml) and stir for 30 minutes. The resultant suspension was allowed to cool at 25-30° C. The obtained solid was filtered, washed with mixture of (1:1) acetonitrile: methyl tert-butyl ether (12.2 ml), water (0.8 ml) and dried at 45-50° C. to afford the pure (−)-Cibenzoline-D-tartaric acid salt (9.3 g) with ≥99% chiral purity measured by chiral HPLC.

Example 9. Preparation of (−)-Cibenzoline Free Base (−)-Cibenzoline-D-tartaric acid salt (10 g, example 7 or 8) was added in water (50 ml) and basified with saturated sodium bicarbonate solution (100 ml) and extracted with dichloromethane (400 ml). The extracted layer was dried over anhydrous sodium sulphate and followed by distillation to get the semisolid as a (−)-Cibenzoline free base (6.2 g) with ≥99% chiral purity measured by chiral HPLC.

Example 10. Preparation of (−)-Cibenzoline succinic Acid Salt

A solution of (−)-Cibenzoline free base (5.0 g, example 9) in isopropanol (50 ml), was stirred at 50° C., followed by addition of succinic acid (1.0 m. eq.) solution in methanol (28 ml) over a period of 10 min and then stirred at 25-30° C. for 30 min, allowed to cool at 0-5° C. for 1 hours. The resultant white solid was filtered and dried at 40-45° C. under vacuum to afford pure (−)-Cibenzoline succinic acid salt (6.3 g) with ≥99% chiral purity measured by chiral HPLC.

EXPERIMENTAL EXAMPLE

Experimental Example 1. X-Ray Powder Diffraction (XRPD) Analysis

The X-ray powder diffraction (XRPD) pattern of (−)-Cibenzoline succinic acid salt of Example 4 was measured under below conditions and the results are presented in FIG. 1.

TABLE 3

| XRPD condition | |
|---|---|
| Start | 2.000 |
| End | 49.998 |
| Step Size | 0.018 |
| Time per Step (sec/step) | 92.40 |
| Temperature | 25° C. (Room) |
| Goniometer Radius | 141.0 |
| 2-theta (°) | 2.000 |
| Theta (°) | 1.000 |
| Phi | 0.00 |
| Anode | Cu |
| kα1 | 1.54060 |
| kα2 | 1.54439 |
| kα2 Ratio | 0.50000 |
| kβ | 1.54060 |
| Generator kV | 30.0 |
| Generator mA | 10.0 |
| Detector Name | LynxEye |
| PSD Opening | 5.015 |
| Sample rotation speed | 15.000 |
| Divergence Slit | n.a |
| Antiscatter Slit | n.a. |
| SUt Mode | n.a. |
| X-Offset | 0.000 |
| Displacement | 0.000 |
| Y-Scale Factor | 1 |
| Y-Offset | 0 |
| Humidity | n.a. |
| Curvature | 1.000 |

As shown in FIG. 1, (−)-Cibenzoline succinic acid salt of Example 4 has an XRPD pattern with peaks at specific 2θ values and is therefore the crystalline form.

Experimental Example 2. Differential Scanning Calorimetry (DSC) Analysis

Figure 2:
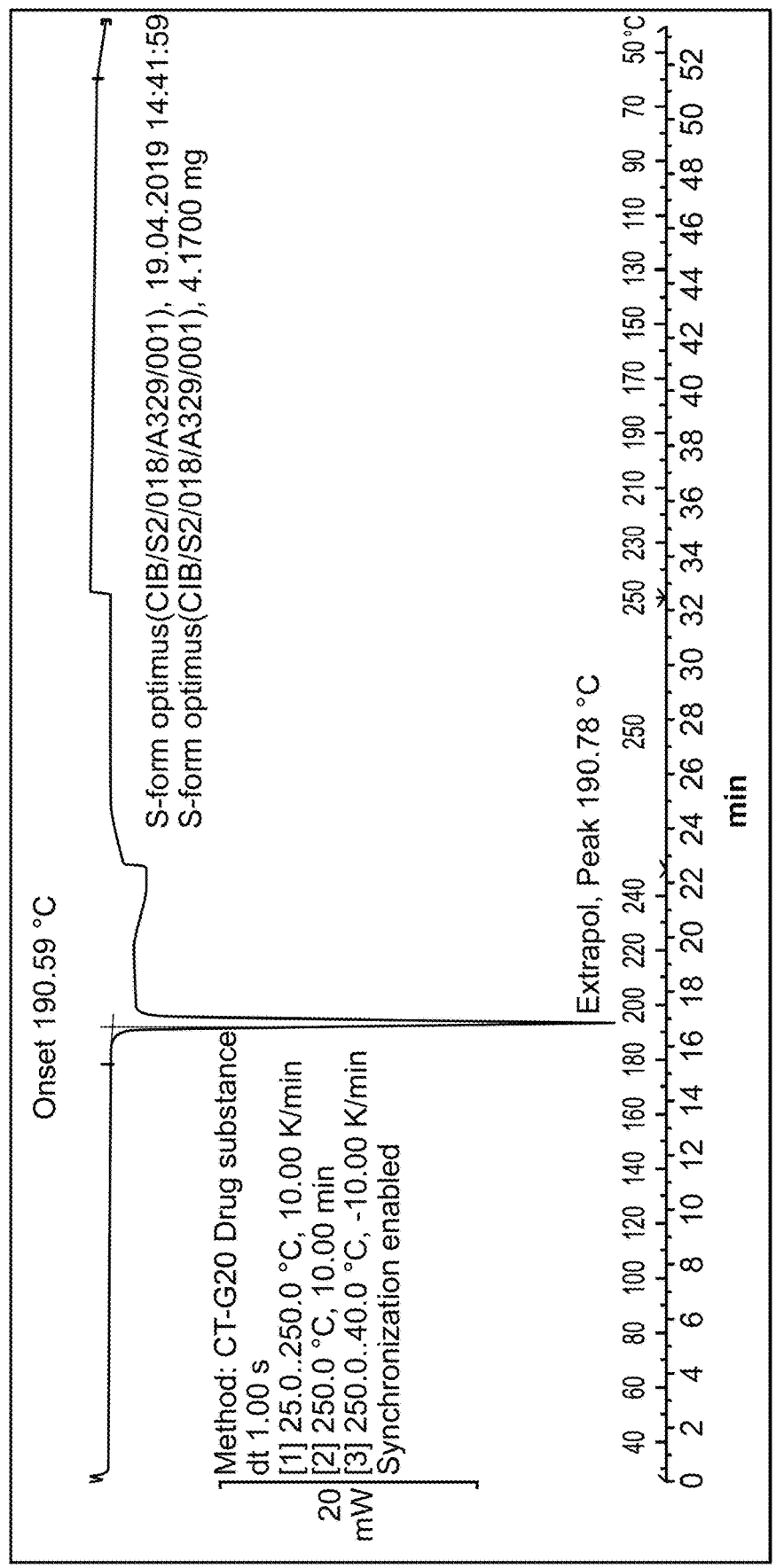
FIG. 2 illustrates the differential scanning calorimetry (DSC) of a crystalline form of (–)-Cibenzoline succinic acid salt according to Example 4.

Differential scanning calorimetry analysis was conducted on the crystalline form of Example 4 under below conditions and the results are shown in FIG. 2.
Manufacturer: Metter Toredo
Model name: DSC 1 STARE system
Heating rate: 25.0° C.~250.0° C. (10.00 K/min), 250.0° C. (10 min), 250.0° C.~40° C. (−10.00 K/min)
Temperature range: 25° C.~250° C./250° C.~40° C.
$N_2$ speed: 100 ml/min.

As shown in FIG. 2, the crystalline form according to the embodiments of the present invention has an endothermic peak at 190.00° C.±2° C. in Differential scanning calorimetry.

Experimental Example 3. Long-Term Storage Stability Test

Long-term storage stability of the crystalline form of (−)-Cibenzoline succinic acid salt of Example 4 was tested under long-term storage conditions.

And related substances was measured by HPLC under below conditions.

TABLE 4

| Related substances by HPLC (% w/w): |
|---|
| Instrumentation: |
| a) A High Performance Liquid Chromatography system with gradient elution capability, a Spectrophotometric UV detector and an auto sampler (Waters Alliance 2695 separations module, Waters 2487 dual λ absorbance detector or equivalent). |

TABLE 4-continued

| Related substances by HPLC (% w/w): | |
|---|---|
| b) Data handling system (Waters Empower work station or equivalent). | |
| Column | Imtakt Unison UK-Phenyl, 250 × 4.6 mm, 3.0 µm |
| Flow rate | 1.0 mL/min |
| UV Detector | 230 nm |
| Buffer | 10 mL Potassium dihydrogen orthophosphate ($KH_2PO_4$) in to 1000 mL of water ph 4.5. |
| Mobile phase-A | Buffer |
| Solution-A | Transfer about 1 mL of Orthophosphoric acid (~85%) in to a 1000 mL of Acetonitrile and mix well. |
| Mobile phase-B | Prepare a degassed mixture of Solution-A and Water in the ratio of 70:30 (v/v) |
| Diluent | Prepare a degassed mixture of Acetonitrile and Water in the ratio of 50:50 (v/v) |

<Packing details>—Primary packing: (−)-Cibenzoline succinic acid salt obtained by Example 4 shall be packed in transparent LDPE bag, twist and tie with Strip seal.
  Secondary packing: The above bag shall be kept in Black color LDPE bag, twist and tie with Strip seal.
  Tertiary packing: The above bag shall be kept Triple laminated aluminum bag with heat seal. Keep this bag in HDPE drum and close with lid.

Specifically, the crystalline form of Example 4 was packed in three levels and subjected to the test at a temperature of 25±2° C. and a relative humidity of 60±5%. The results are provided in Table 5.

TABLE 5

| Parameter | | Specification | Initial | 1-month | 2-month | 3-month | 6-month |
|---|---|---|---|---|---|---|---|
| Description | | A White to off-white crystalline powder | A White crystalline powder | A White crystalline powder | A White crystalline powder | A White crystalline powder | A White crystalline powder |
| Identification by IR | | The infrared absorption peaks observed at 1674 ± 5 $cm^{-1}$ and 2954 ± 5 $cm^{-1}$ | Complies | Complies | Complies | Complies | Complies |
| Loss on drying at 105° C. for 3 hours(% w/w) | | Not more than 0.50 | 0.11 | 0.04 | 0.07 | 0.14 | 0.18 |
| Assay by potentiometry (% w/w, on dried basis) | | Not less than 98.0 and not more than 102.0 | 100.1 | 99.9 | 100.1 | 100.2 | 100.2 |
| Chiral purity by HPLC (% Area normalization) S-Isomer Content | | Not less than 99.0 | 100.0 | 100.0 | 100.0 | 100.0 | 100.0 |
| Chiral purity by HPLC (% Area normalization) R-Isomer Content | | Not more than 1.0 | Not detected | Not detected | Not detected | Not detected | Not detected |
| Related substance by HPLC(% w/w) | Carbonitrile atermediate | Not more than 0.20 | Not detected | Not detected | Not detected | Not detected | Not detected |
| | Cyclopropane carboxamate | Not more than 0.10 | Not detected | Not detected | Not detected | Not detected | Not detected |
| | Single maximum unknown impurity | Not more than 0.10 | 0.01 | 0.01 | 0.01 | Not detected | Not detected |
| | Total impurity | Not more than 0.50 | 0.01 | 0.01 | 0.01 | Not detected | Not detected |

As shown in Table 5, a white crystalline powder form was uniformly maintained for six months under long-term storage conditions.

With respect to the loss on drying at 105° C. for 3 hours, the loss rate (% w/w) at the initial stage was 0.11%, which is less than 0.5%. After 1-6 months under long-term storage conditions, the loss rate after drying at 105° C. for 3 hours was on a similar level as observed at the initial stage.

The (S)-form ((−)-Cibenzoline) of Example 4 was not changed to (R)-form ((+)-Cibenzoline) under long-term storage conditions and stably maintained, demonstrating a remarkably excellent stability.

In addition, as confirmed from the potentiometry analysis results, it was measured between equal to or more than 98% and 102% at the initial stage and even after storing for 1-6 months, demonstrating that the initial level was maintained.

Impurities were nearly not detected under long-term storage conditions, demonstrating that the crystalline form of (−)-Cibenzoline succinic acid salt according to Example 4 maintained high purity with no change even under long-term storage conditions and therefore had an excellent stability.

Experimental Example 4. Accelerated Stability Test

Accelerated stability of the crystalline form of (−)-Cibenzoline succinic acid salt of Example 4 was tested under accelerated test conditions.

TABLE 6

| Related substances by HPLC (% w/w): |  |
|---|---|
| Instrumentation: | |
| c) A High Performance Liquid Chromatography system with gradient elution capability, a Spectrophotometric UV detector and an auto sampler (Waters Alliance 2695 separations module, Waters 2487 dual λ absorbance detector or equivalent). | |
| d) Data handling system (Waters Empower work station or equivalent). | |
| Column | Imtakt Unison UK-Phenyl, 250 × 4.6 mm, 3.0 μm |
| Flow rate | 1.0 mL/min |
| UV Detector | 230 nm |
| Buffer | 10 mL Potassium dihydrogen orthophosphate ($KH_2PO_4$) in to 1000 mL of water ph 4.5. |
| Mobile phase-A | Buffer |
| Solution-A | Transfer about 1 mL of Orthophosphoric acid (~85%) in to a 1000 mL of Acetonitrile and mix well. |
| Mobile phase-B | Prepare a degassed mixture of Solution-A and Water in the ratio of 70:30 (v/v) |
| Diluent | Prepare a degassed mixture of Acetonitrile and Water in the ratio of 50:50 (v/v) |

<Packing details>—Primary packing: (−)-Cibenzoline succinic acid salt obtained by Example 4 shall be packed in transparent LDPE bag, twist and tie with Strip seal.

Secondary packing: The above bag shall be kept in Black color LDPE bag, twist and tie with Strip seal.

Tertiary packing: The above bag shall be kept Triple laminated aluminum bag with heat seal. Keep this bag in HDPE drum and close with lid.

Specifically, the crystalline form of Example 4 was packed in three levels and subjected to the test at a temperature of 40±2° C. and a relative humidity of 75±5%. The results are provided in Table 7.

TABLE 7

| Parameter | Specification | Initial | 1-month | 2-month | 3-month | 6-month |
|---|---|---|---|---|---|---|
| Description | A White to off-white crystalline powder | A White crystalline powder | A White crystalline powder | A White crystalline powder | A White crystalline powder | A White crystalline powder |
| Identification by IR | The infrared absorption peaks observed at 1674 ± 5 $cm^{-1}$ and 2954 ± 5 $cm^{-1}$ | Complies | Complies | Complies | Complies | Complies |
| Loss on drying at 105° C. for 3 hours(% w/w) | Not more than 0.50 | 0.11 | 0.15 | 0.12 | 0.09 | 0.10 |
| Assay by potentiometry (% w/w, on dried basis) | Not less than 98.0 and not more than 102.0 | 100.1 | 100.1 | 100.3 | 100.1 | 99.6 |
| Chiral purity by HPLC (% Area normalization) S-Isomer Content | Not less than 99.0 | 100.0 | 100.0 | 100.0 | 100.0 | 100.0 |
| Chiral purity by HPLC (% Area normalization) R-Isomer Content | Not more than 1.0 | Not detected | Not detected | Not detected | Not detected | Not detected |

TABLE 7-continued

| Parameter | | Specification | Initial | 1-month | 2-month | 3-month | 6-month |
|---|---|---|---|---|---|---|---|
| Related Substance by HPLC(% w/w) | Carbonitrile intermediate | Not more than 0.20 | Not detected | Not detected | Not detected | Not detected | Not detected |
| | Cyclopropane carboxamate | Not more than 0.10 | Not detected | Not detected | Not detected | Not detected | Not detected |
| | Single maximum unknown impurity | Not more than 0.10 | 0.01 | 0.01 | Not detected | Not detected | Not detected |
| | Total impurity | Not more than 0.50 | 0.01 | 0.01 | Not detected | Not detected | Not detected |

As shown in Table 7, a white crystalline powder form was uniformly maintained for six months under accelerated conditions. With respect to the loss on drying at 105° C. for 3 hours, the loss rate at the initial stage was 0.11% which is less than 0.5%. After 1-6 months under accelerated conditions, the loss rate after drying at 105° C. for 3 hours was on a similar level as observed at the initial stage.

The (S)-form ((−)-Cibenzoline) of Example 4 was not changed to (R)-form ((+)-Cibenzoline) under long-term storage conditions and stably maintained, demonstrating a remarkably excellent stability.

As confirmed from the potentiometry analysis results, it was measured between equal to or more than 98% and 102% at the initial stage and even after storing for 1-6 months, demonstrating that the initial level was maintained.

Impurities were nearly not detected under accelerated conditions, demonstrating that the crystalline form of (−)-Cibenzoline succinic acid salt according to according to Example 4 maintained high purity with no change even under accelerated conditions and therefore had an excellent stability.

Experimental Example 5. Particle Size Analysis

Particle size analysis of the crystalline form of (−)-Cibenzoline succinic acid salt of Example 4 was tested by using a particle size analyzer of Malvern (model MASSTERSIZER 3000). The powder sample was dispersed with a dispersion pressure of 2 bar. The results are provided in Table 8.

TABLE 8

| $d_{90}$ (μm) | $d_{50}$ (μm) | $d_{10}$ (μm) | Classification |
|---|---|---|---|
| 265 | 104 | 15.2 | Very fine |

The accompanying Table 9 (ref. 2019 USP 42 NF 37 Volume 4 physical tests <811> powder fineness) indicates particle size distribution associated with corresponding values.

TABLE 9

| Descriptive term | $X_{50}$ (μm) | Cumulative Distribution by volume basis, Q3(x) |
|---|---|---|
| Coarse | >355 | Q3(355) < 0.50 |
| Moderately Fine | 180-355 | Q3(180) < 0.50 and Q3(355) > 0.50 |
| Fine | 125-180 | Q3(125) < 0.50 and Q3(180) > 0.50 |
| Very Fine | ≤125 | Q3(125) < 0.50 |

As confirmed from the Particle Size Analysis results, $d_{50}$ (μm) was measured 104 (μm), demonstrating that the Particle Size was very fine.

Experimental Example 6. Hygroscopicity

The hygroscopicity was to describe the water vapor uptake behavior of solid by mass changes.

The hygroscopicity of the crystalline form of (−)-Cibenzoline succinic acid salt of Example 4 was tested under the conditions of 25±1° C. for 24 hours at 80±2% RH.

The result is presented in Table 10.

TABLE 10

| Container weight (g) | Container weight with sample (g) | Container weight with sample stored in chamber for 24 hours (g) | Mass change (%) |
|---|---|---|---|
| 19.1582 | 24.1611 | 24.1621 | 0.01 |

The results of the hygroscopicity study shall be interpreted based on the criteria in Table 11 (ref. EUROPEAN PHARMACOPOEIA 9.0 volume 1 5.11. characters section in monographs).

TABLE 11

| Descriptive term | % Incorporation of water |
|---|---|
| Deliquescent | Sufficient water is absorbed to form a liquid |
| Very hygroscopic | Increase in mass is ≥15% |
| Hygroscopic | Increase in mass is <15% and ≥2% |
| Slightly hygroscopic | Increase in mass is <2% and ≥0.2% |

As confirmed from the Hygroscopicity results, mass change was measured 0.01%, evaluating "Non hygroscopic".

Experimental Example 7. Solubility

The solubility of the crystalline form of (−)-Cibenzoline succinic acid salt of Example 4 on three different pH media was tasted by using a HPLC of Agilent (model AGILENT 1260SERIES). The crystalline form of Example 4 was added until precipitated in each medium. Thereafter, the mixture was stirred for 1 hour and allowed to stand for one hour. 1 ml of the supernatant of the stationary solution was sampled and diluted 10 times with methanol. The diluted solvent was analyzed by HPLC, and the solubility was measured using the width of the (−)-Cibenzoline succinic acid salt peak. The HPLC analysis conditions are shown in Table 12. The results are summarized in Table 13.

TABLE 12

| | HPLC condition |
|---|---|
| Column | Inertsil ODS-3V, 4.6 × 150 mm, 5 um |
| Mobile phase | Buffer*: Acetonitrile = 650:350 |
| | *Buffer: Weigh and transfer about 2.16 g of Sodium 1-octanesulfonate and about 1.36 g of potassium phosphate monobasic into 1000 mL Milli-Q Water. Adjust the pH 5.7 ± 0.02 with diluted potassium hydroxide solution. |
| flow rate | 1.5 mL/min |
| detection | UV, 222 nm |

TABLE 13

| Media/Buffer | Avg. (mg/mL) at 37° C. |
|---|---|
| Purified water* | 41.400 |
| 0.1N HCl (pH 1.0~1.2) | 65.158 |
| phosphate buffer (pH 6.8) | 44.934 |

*Purified water was made by Water Purification System for Ultrapure Water of Millipore (Model: Milli-Q Integral).

The accompanying Table 14 (ref. 2015 USP 38 NF 33 general notices and requirements 5.30. Description and Solubility) indicates solubility associated with corresponding values.

TABLE 14

| Descriptive term | Part of the solvent(ml) required per part of solute (1 g) |
|---|---|
| Very soluble | Less than 1 |
| Freely soluble | From 1 to 10 |
| Soluble | From 1 to 30 |
| Sparingly soluble | From 30 to 100 |
| Slightly soluble | From 100 to 1,000 |
| Very slightly soluble | From 1,000 to 10,000 |
| Practically insoluble | 10,000 and over |

As confirmed from the solubility results, average solubility was measured more than 40 mg/mL (equal to 1 g/25 mL) evaluating high solubility.

The invention claimed is:

1. A crystalline form of (−)-Cibenzoline succinic acid salt of formula (IA)

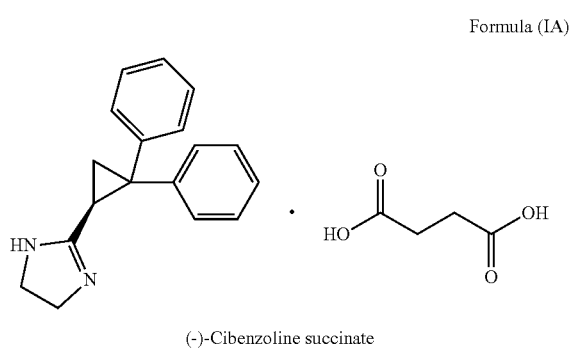 [SMILES: c1ccc(C2(c3ccccc3)C[C@@H]2C2=NCCN2)cc1 ; O=C(O)CCC(=O)O]

(−)-Cibenzoline succinate wherein the crystalline form has an X-ray powder diffraction (XRPD) pattern comprising diffraction peaks at 11.2°, 14.1°, 17.3°, 22.10, 23.0°, and 24.3° (2θ±0.2°).

2. The crystalline form of (−)-Cibenzoline succinic acid salt as claimed in claim 1, wherein the crystalline form has the XRPD pattern further comprising one or more diffraction peaks selected from the group consisting of 17.6°, 18.2°, 21.4°, and 26.4° (2θ±0.2°).

3. A crystalline form of (−)-Cibenzoline succinic acid salt of formula (IA)

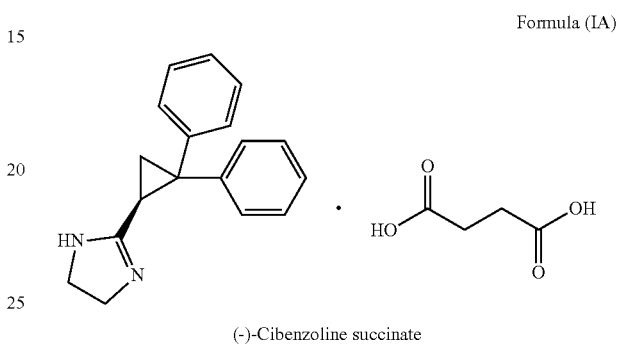

(−)-Cibenzoline succinate wherein the crystalline form has an XRPD pattern comprising diffraction peaks at 8.99°, 11.15°, 13.36°, 14.09°, 14.30°, 17.29°, 17.59°, 18.15°, 19.81°, 21.37°, 22.06°, 22.93°, 24.25°, 25.41°, 26.36°, 27.59°, and 29.50° (2θ).

4. The crystalline form of (−)-Cibenzoline succinic acid salt as claimed in claim 1, wherein the crystalline form has a differential scanning calorimetry (DSC) endothermic peak at 187 to 193° C. at heating rate of 10° C./min.

5. The crystalline form of (−)-Cibenzoline succinic acid salt as claimed in claim 4, wherein the crystalline form has a differential scanning calorimetry (DSC) endothermic peak at 190±1° C. at heating rate of 10° C./min.

6. A pharmaceutical composition comprising the crystalline form of (−)-Cibenzoline succinic acid salt as claimed in claim 1 as an active ingredient and a pharmaceutically acceptable carrier, diluent, or excipient.

7. The composition of claim 6, which is of the form of a capsule or a tablet for oral administration.

8. A pharmaceutical composition comprising the crystalline form of (−)-Cibenzoline succinic acid salt as claimed in claim 2, as an active ingredient and a pharmaceutically acceptable carrier, diluent, or excipient.

9. The composition of claim 8, which is of the form of a capsule or a tablet for oral administration.

10. A pharmaceutical composition comprising the crystalline form of (−)-Cibenzoline succinic acid salt as claimed in claim 3 as an active ingredient and a pharmaceutically acceptable carrier, diluent, or excipient.

11. The composition of claim 10, which is of the form of a capsule or a tablet for oral administration.

* * * * *